US008667070B2

(12) United States Patent
Uchiyama et al.

(10) Patent No.: US 8,667,070 B2
(45) Date of Patent: Mar. 4, 2014

(54) STORAGE MEDIUM STORING A MAIL MANAGEMENT PROGRAM, AND MAIL MANAGEMENT APPARATUS AND METHOD

(75) Inventors: Atsushi Uchiyama, Kawasaki (JP); Jun Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 468 days.

(21) Appl. No.: 12/722,695

(22) Filed: Mar. 12, 2010

(65) Prior Publication Data
US 2010/0235456 A1  Sep. 16, 2010

(30) Foreign Application Priority Data

Mar. 13, 2009  (JP) .................................. 2009-61376

(51) Int. Cl.
*G06F 15/16* (2006.01)
(52) U.S. Cl.
USPC ........... 709/206; 709/207; 709/239; 709/203; 709/217
(58) Field of Classification Search
USPC ........................... 709/206–207, 239, 203, 217
See application file for complete search history.

(56) References Cited

U.S. PATENT DOCUMENTS

| | | | | |
|---|---|---|---|---|
| 2001/0042103 A1* | 11/2001 | Tomari et al. | ................. | 709/206 |
| 2002/0112006 A1* | 8/2002 | Kuriki et al. | ................. | 709/206 |
| 2002/0156854 A1* | 10/2002 | Matsumoto | ................... | 709/206 |
| 2002/0165898 A1* | 11/2002 | Duffy et al. | .................... | 709/102 |
| 2003/0229722 A1* | 12/2003 | Beyda | .......................... | 709/310 |
| 2006/0041626 A1* | 2/2006 | Chen et al. | ..................... | 709/206 |
| 2007/0244977 A1* | 10/2007 | Atkins | ........................ | 709/206 |
| 2007/0299923 A1* | 12/2007 | Skelly et al. | .................. | 709/206 |
| 2008/0120421 A1* | 5/2008 | Gupta et al. | .................. | 709/229 |
| 2009/0138557 A1* | 5/2009 | Lyle et al. | ..................... | 709/206 |

FOREIGN PATENT DOCUMENTS

| | | |
|---|---|---|
| JP | 2001-222477 | 8/2001 |
| JP | 2002-82876 | 3/2002 |

\* cited by examiner

*Primary Examiner* — Wing F Chan
*Assistant Examiner* — Benjamin M Thieu
(74) *Attorney, Agent, or Firm* — Fujitsu Patent Center

(57) ABSTRACT

A storage medium storing a mail management program, the mail management program causing a computer to execute: receiving from a first user, a designation of a first electronic mail addressed to the first user as an open mail, which is made open to a second user, first setting a receiving date and time at which the designation is received as date and time information corresponding to the open mail, second setting another receiving date and time at which a second electronic mail which is not the open mail and is addressed to the second user is received by the computer, as the date and time information corresponding to the second electronic mail and outputting, upon receipt of an output instruction from the second user, the open mail and the second electronic mail in accordance with the date and time information.

14 Claims, 31 Drawing Sheets

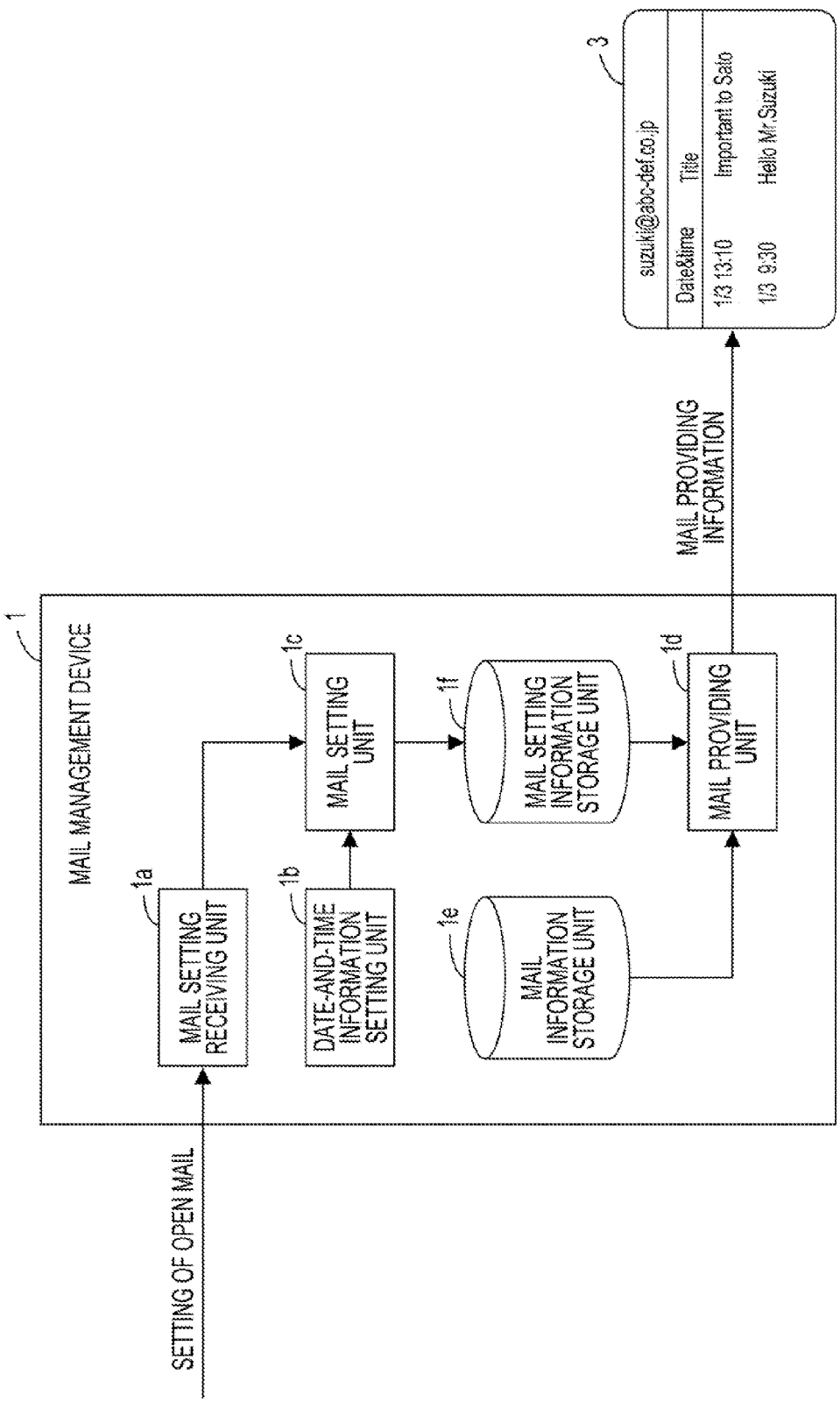

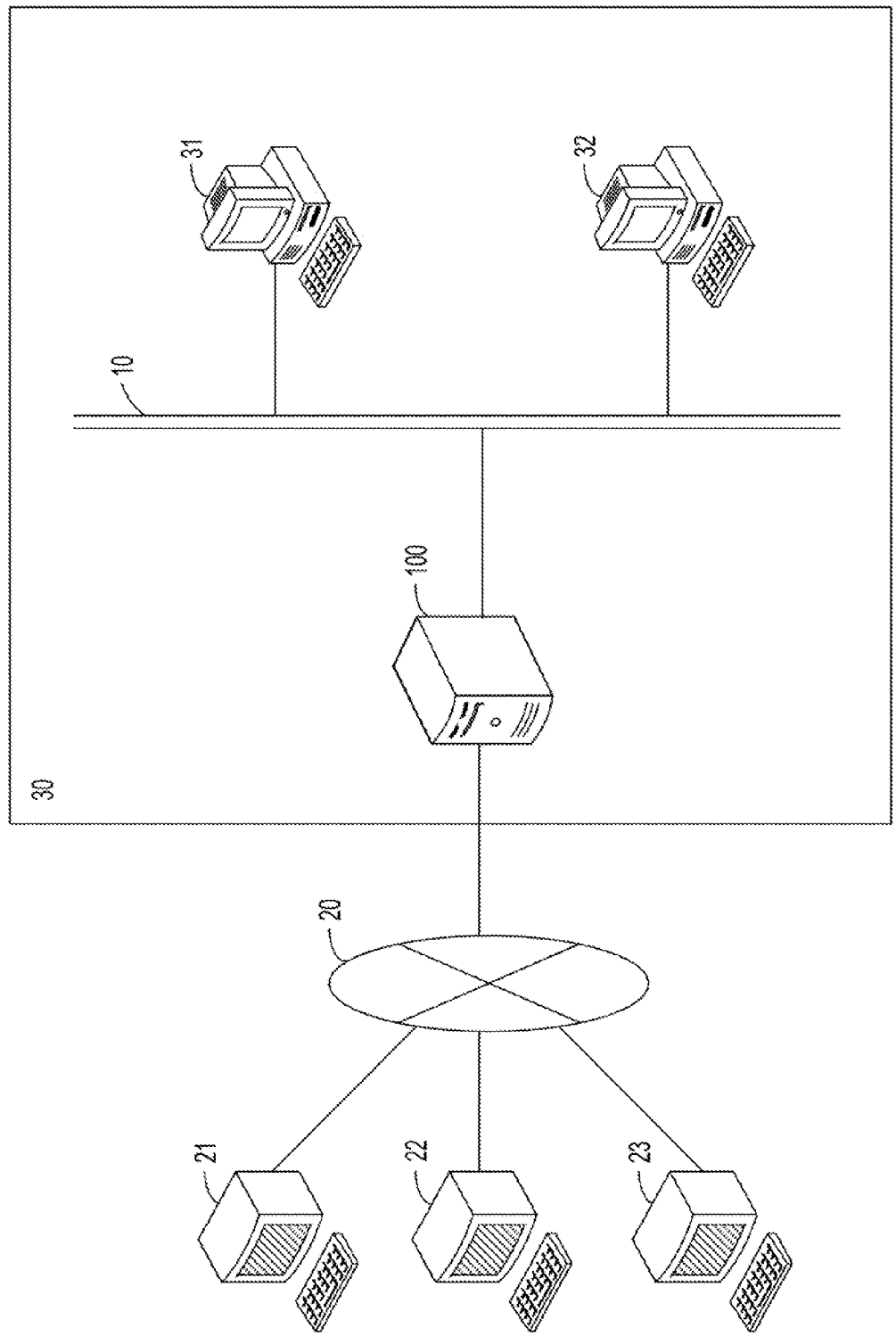

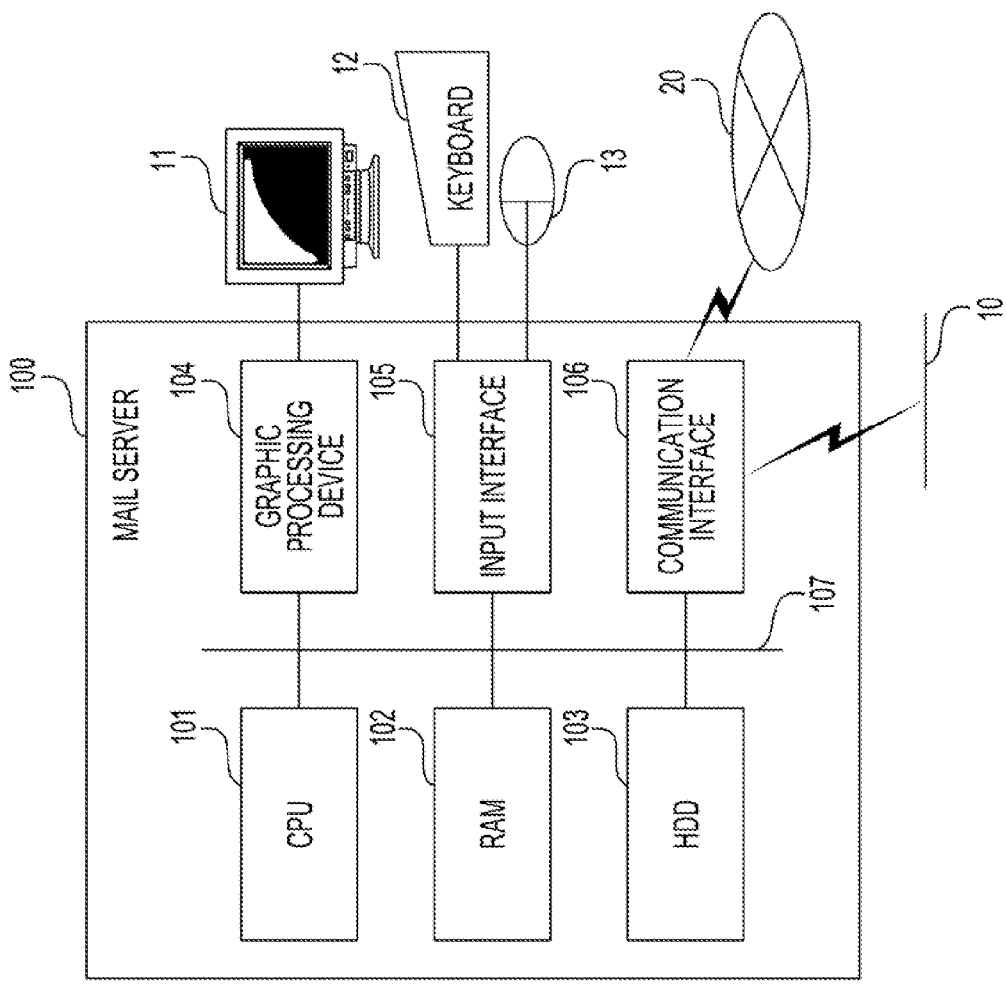

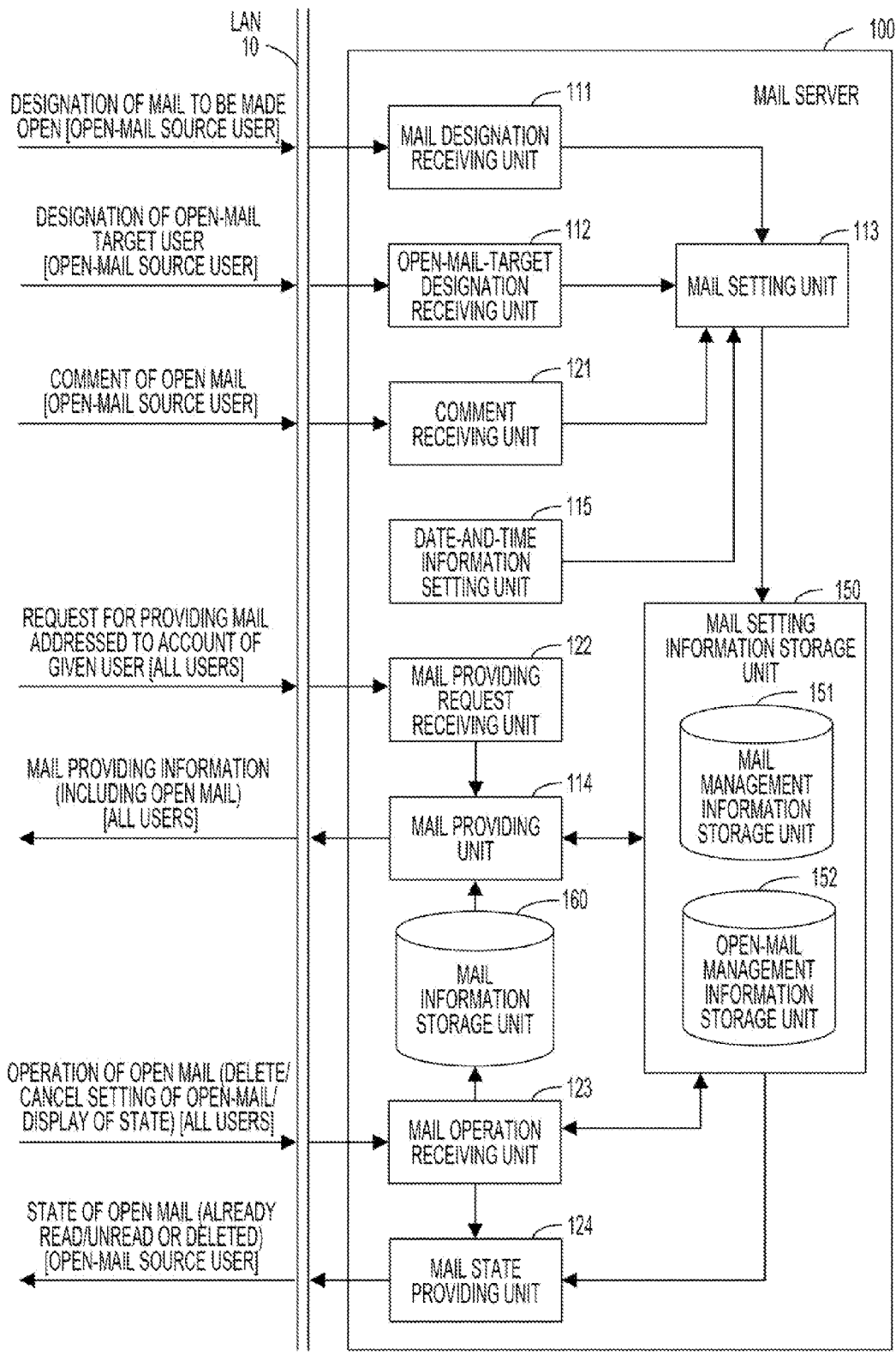

FIG.5

| USER ID | MESSAGE ID | FOLDER | DATE AND TIME OF SENDING/RECEIPT | SUBJECT | MAIL PATH | MAIL TYPE | MAIL-OPENED FLAG | COMMENT |
|---|---|---|---|---|---|---|---|---|
| 001 | 00000011 | INBOX | 20081221 11:34:13 | TOMORROW'S SCHEDULE | /mailspool/xxx.eml | NORMAL | OPENED | |
| 001 | 00000012 | INBOX | 20081223 09:24:37 | Re: INFORMATION | /mailspool/yyy.eml | NORMAL | OPENED | |
| 001 | 00000005 | INBOX | 20081130 06:24:12 | BRIEFING | /mailspool/zzz.eml | NORMAL | OPENED | WE RECEIVED SPECIFICATION FROM ABC CORP. ... |
| 001 | 00000013 | MAIL CURRENTLY OPEN | 20081128 12:20:20 | DATE OF ARREAR MANAGEMENT TRAINING | /mailspool/aaa.eml | OPEN | OPENED | |
| 011 | 00000101 | INBOX | 20081130 12:20:20 | BRIEFING | /mailspool/zzz.eml | NORMAL | UNOPENED | WE RECEIVED SPECIFICATION FROM ABC CORP. ... |
| 011 | 00000102 | INBOX | 20081130 12:20:20 | BRIEFING | /mailspool/zzz.eml | OPEN | UNOPENED | WE RECEIVED SPECIFICATION FROM ABC CORP. ... |
| 012 | 00000132 | INBOX | 20081130 12:20:20 | BRIEFING | | OPEN | UNOPENED | |
| ... | ... | ... | ... | ... | ... | ... | ... | ... |

| OPEN-MAIL SOURCE USER ID | OPEN-MAIL SOURCE MESSAGE ID | OPEN-MAIL TARGET USER ID | OPEN-MAIL-TARGET MESSAGE ID | DATE AND TIME OF BEING MADE OPEN | DATE AND TIME OF OPENING AT OPEN-MAIL TARGET | STATE | LATEST STATE UPDATE DATE AND TIME |
|---|---|---|---|---|---|---|---|
| 091 | 00000005 | 011 | 00000102 | 20081130 12:20:20 | 20081201 08:50:54 | CURRENTLY OPEN | |
| 091 | 00000005 | 012 | 00000132 | 20081130 12:20:20 | 20081202 13:00:23 | DELETED | 20081202 13:00:35 |
| 091 | 00000005 | 020 | 00000065 | 20081130 12:20:20 | 20081130 13:00:13 | DELETED | 20081130 13:00:54 |
| 091 | 00000005 | 021 | 00000104 | 20081130 12:20:20 | 20081130 15:20:53 | CURRENTLY OPEN | |
| 094 | 00000021 | 011 | 00000103 | 20081201 08:52:34 | 20081130 12:20:20 | DELETED | |
| 094 | 00000021 | 017 | 00000095 | 20081201 08:52:34 | 20081130 12:20:20 | DELETED | |

152a

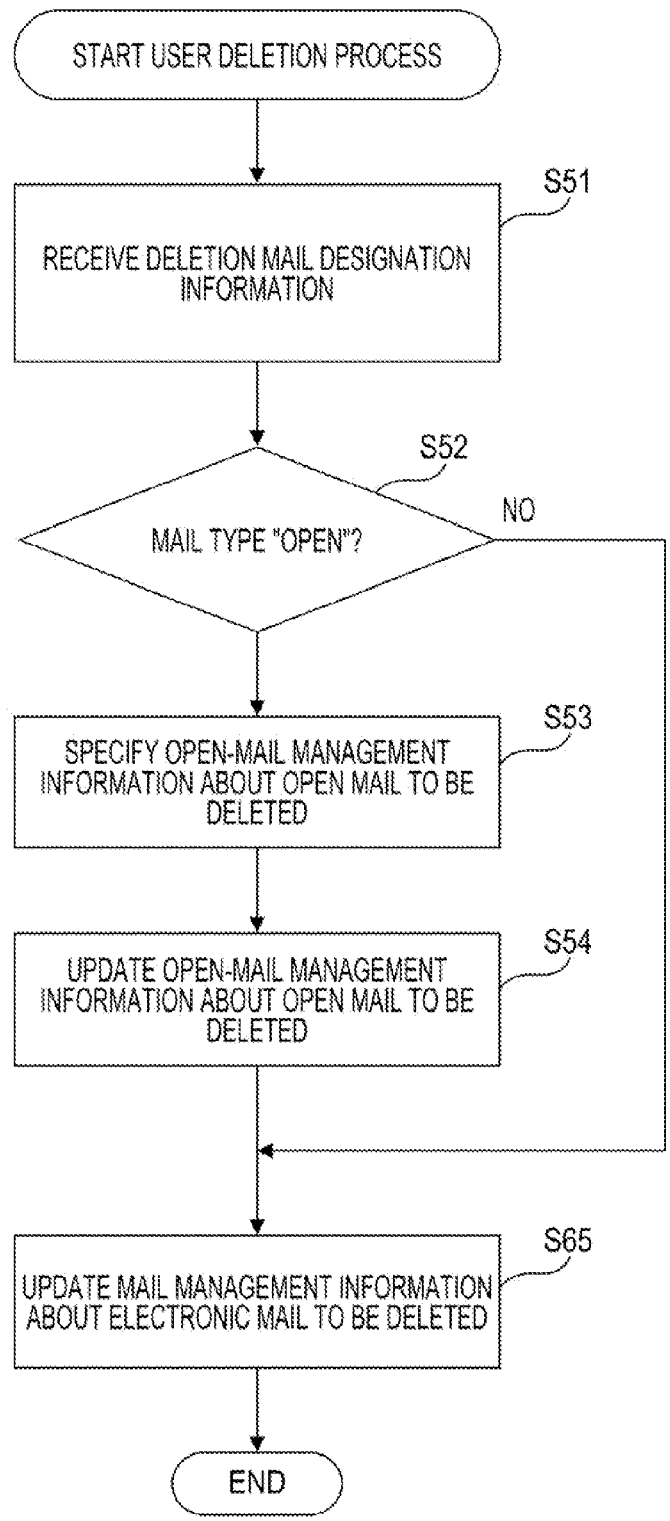

FIG.11

| USER ID | MESSAGE ID | FOLDER | DATE AND TIME OF SENDING/ RECEIPT | SUBJECT | MAIL PATH | MAIL TYPE | MAIL-OPENED FLAG | COMMENT |
|---|---|---|---|---|---|---|---|---|
| 001 | 00000011 | INBOX | 20081210 10:21:02 | INFORMATION ABOUT NEW YEAR PARTY | /mailspool/a1210.eml | NORMAL | OPENED | |
| 001 | 00000012 | INBOX | 20081225 16:11:28 | NEW FUNCTIONS | /mailspool/a1225.eml | NORMAL | OPENED | |
| 001 | 00000013 | INBOX | 20081230 12:31:20 | Re: REPLY | /mailspool/a1230.eml | NORMAL | UNOPENED | |
| 013 | 00000005 | INBOX | 20081222 10:17:58 | THANK YOU | /mailspool/b1222.eml | NORMAL | OPENED | |
| 013 | 00000006 | INBOX | 20081225 11:31:23 | MEETING ROOM | /mailspool/b1225.eml | NORMAL | OPENED | |
| 013 | 00000007 | INBOX | 20090103 20:11:04 | TOMORROW'S SCHEDULE | /mailspool/b0103.eml | NORMAL | UNOPENED | |

| USER ID | MESSAGE ID | FOLDER | DATE AND TIME OF SENDING/RECEIPT | SUBJECT | MAIL PATH | MAIL TYPE | MAIL-OPENED FLAG | COMMENT |
|---|---|---|---|---|---|---|---|---|
| 001 | 00000011 | INBOX | 20081210 10:21:02 | INFORMATION ABOUT NEW YEAR PARTY | /mailspool/a1210.eml | NORMAL | OPENED | |
| 001 | 00000012 | INBOX | 20081225 16:11:28 | NEW FUNCTIONS | /mailspool/b1225.eml | NORMAL | OPENED | |
| 001 | 00000013 | INBOX | 20081230 12:34:20 | Re: REPLY | /mailspool/a1230.eml | NORMAL | UNOPENED | |
| 001 | 00000014 | MAIL CURRENTLY OPEN | 20090105 09:01:18 | NEW FUNCTIONS | /mailspool/a1225.eml | OPEN | OPENED | WE RECEIVED SPECIFICATION FROM ABC CORP. ... |
| 013 | 00000005 | INBOX | 20081222 10:17:58 | THANK YOU | /mailspool/a1222.eml | NORMAL | OPENED | |
| 013 | 00000006 | INBOX | 20081225 11:31:23 | MEETING ROOM | /mailspool/b1225.eml | NORMAL | OPENED | |
| 013 | 00000007 | INBOX | 20090103 20:11:04 | TOMORROW'S SCHEDULE | /mailspool/b0103.eml | NORMAL | UNOPENED | |
| 013 | 00000008 | INBOX | 20090105 09:01:18 | NEW FUNCTIONS | /mailspool/a1225.eml | OPEN | UNOPENED | WE RECEIVED SPECIFICATION FROM ABC CORP. ... |

| OPEN-MAIL SOURCE USER ID | OPEN-MAIL SOURCE MESSAGE ID | OPEN-MAIL TARGET USER ID | OPEN-MAIL TARGET MESSAGE ID | DATE AND TIME OF BEING MADE OPEN | DATE AND TIME OF OPENING AT OPEN-MAIL TARGET | STATE | LATEST STATE UPDATE DATE AND TIME |
|---|---|---|---|---|---|---|---|
| 001 | 00000012 | 013 | 00000008 | 20090105 09:01:18 | | CURRENTLY OPEN | |

| SUBJECT | SENDER | DATE AND TIME OF RECEIPT |
|---|---|---|
| NEW FUNCTIONS | jiro@abc.co... | 2009/01/05 09:01:18 |
| Re: TOMORROW'S SCHEDULE | nagano@rst... | 2009/01/03 20:11:04 |
| MEETING ROOM | jiro@abc.co... | 2008/12/25 11:31:23 |
| THANK YOU | jiro@abc.co... | 2008/12/22 10:17:56 |

■HOME
+ INBOX
+ SENT
+ TRASH BOX
+ RECEIVED FROM XX
+ IN-SECTION INFORMATION
+ PRESIDENT

SENDER : jiro@abc.co.jp
DESTINATION : sato.a@fgh.co.jp
DATE AND TIME : Thu,05 Jan 2009 09:01:18 +0900
SUBJECT: NEW FUNCTIONS
COMMENT: WE RECEIVED SPECIFICATION FROM ABC CORP. PLEASE CHECK IT Dear Mr.Tanaka
...

[CURRENTLY OPEN]
TANAKA 275, 275b, 275b1, 275b2, 275b3, 275a, 275c, 275d, 275e

FIG.20

| USER ID | USER ID | FOLDER | DATE AND TIME OF SENDING/RECEIPT | SUBJECT | MAIL PATH | MAIL TYPE | MAIL-OPENED FLAG | COMMENT |
|---|---|---|---|---|---|---|---|---|
| 001 | 00000011 | INBOX | 20081210 10:21:02 | INFORMATION ABOUT NEW YEAR PARTY | /mailspool/a1210.eml | NORMAL | OPENED | |
| 001 | 00000012 | INBOX | 20081225 16:11:28 | NEW FUNCTIONS | /mailspool/a1225.eml | NORMAL | OPENED | |
| 001 | 00000013 | INBOX | 20081230 12:31:20 | Re: REPLY | /mailspool/a1230.eml | NORMAL | UNOPENED | |
| 001 | 00000014 | MAIL CURRENTLY OPEN | 20090105 09:01:18 | NEW FUNCTIONS | /mailspool/a1225.eml | OPEN | OPENED | WE RECEIVED SPECIFICATION FROM ABC CORP.... |
| 013 | 00000005 | INBOX | 20081222 10:17:58 | THANK YOU | /mailspool/b1222.eml | NORMAL | OPENED | |
| 013 | 00000006 | INBOX | 20081225 11:31:23 | MEETING ROOM | /mailspool/b1225.eml | NORMAL | OPENED | |
| 013 | 00000007 | INBOX | 20090103 20:11:04 | TOMORROW'S SCHEDULE | /mailspool/b0103.eml | NORMAL | UNOPENED | |
| 013 | 00000008 | INBOX | 20090105 09:01:18 | NEW FUNCTIONS | /mailspool/a1225.eml | OPEN | OPENED | WE RECEIVED SPECIFICATION FROM ABC CORP.... |

| OPEN-MAIL SOURCE USER ID | OPEN-MAIL SOURCE MESSAGE ID | OPEN-MAIL TARGET USER ID | OPEN-MAIL-TARGET MESSAGE ID | DATE AND TIME OF BEING MADE OPEN | DATE AND TIME OF OPENING AT OPEN-MAIL TARGET | STATE | LATEST STATE UPDATE DATE AND TIME |
|---|---|---|---|---|---|---|---|
| 001 | 00000012 | 013 | 00000038 | 20090105 09:01:18 | 20090105 11:22:40 | CURRENTLY OPEN | |

| DATE AND TIME OF BEING MADE OPEN | DATE AND TIME OF OPENING | LATEST STATE UPDATE DATE AND TIME | USER NAME | STATE |
|---|---|---|---|---|
| 2009/01/05 09:01:18 | 2009/01/05 11:22:40 | | SATO<sato.a@fgh.co.jp> | CURRENTLY OPEN |
| | | ... | | |

197

197a

197b — CLOSE

FIG.24

| USER ID | MESSAGE ID | FOLDER | DATE AND TIME OF SENDING/RECEIPT | SUBJECT | MAIL PATH | MAIL TYPE | MAIL-OPENED FLAG | COMMENT |
|---|---|---|---|---|---|---|---|---|
| 001 | 00000011 | INBOX | 20081210 10:21:02 | INFORMATION ABOUT NEW YEAR PARTY | /mailspool/a1210.eml | NORMAL | OPENED | |
| 001 | 00000012 | INBOX | 20081225 16:11:28 | NEW FUNCTIONS | /mailspool/a1225.eml | NORMAL | UNOPENED | |
| 001 | 00000013 | INBOX | 20081230 12:31:20 | Re: REPLY | /mailspool/a1230.eml | NORMAL | OPENED | |
| 001 | 00000014 | MAIL CURRENTLY OPEN | 20090105 09:01:18 | NEW FUNCTIONS | /mailspool/a1225.eml | OPEN | UNOPENED | WE RECEIVED SPECIFICATION FROM ABC CORP. ... |
| 013 | 00000005 | INBOX | 20081222 10:17:58 | THANK YOU | /mailspool/b1222.eml | NORMAL | OPENED | |
| 013 | 00000006 | INBOX | 20081225 11:31:23 | MEETING ROOM | /mailspool/b1225.eml | NORMAL | OPENED | |
| 013 | 00000007 | INBOX | 20090103 20:11:04 | TOMORROW'S SCHEDULE | /mailspool/b0103.eml | NORMAL | UNOPENED | |

| OPEN-MAIL SOURCE USER ID | OPEN-MAIL SOURCE MESSAGE ID | OPEN-MAIL TARGET USER ID | OPEN-MAIL-TARGET MESSAGE ID | DATE AND TIME OF BEING MADE OPEN | DATE AND TIME OF OPENING AT OPEN-MAIL TARGET | STATE | LATEST STATE UPDATE DATE AND TIME |
|---|---|---|---|---|---|---|---|
| 001 | 00000012 | 013 | 00000008 | 20090105 09:01:18 | 20090105 11:22:40 | DELETED | 20090105 11:25:31 |

FIG.26

| DATE AND TIME OF BEING MADE OPEN | DATE AND TIME OF OPENING | LATEST STATE UPDATE DATE AND TIME | USER NAME | STATE |
|---|---|---|---|---|
| 2009/01/05 09:01:18 | 2009/01/05 11:22:40 | 2009/01/05 11:25:31 | SATO<sato.a@fgh.co.jp> | DELETED |
| | | ... | | |

CLOSE

FIG.28

| USER ID | MESSAGE ID | FOLDER | DATE AND TIME OF SENDING/RECEIPT | SUBJECT | MAIL PATH | MAIL TYPE | MAIL-OPENED FLAG | COMMENT |
|---|---|---|---|---|---|---|---|---|
| 001 | 00000011 | INBOX | 20081210 10:21:02 | INFORMATION ABOUT NEW YEAR PARTY | /mailspool/a1210.eml | NORMAL | OPENED | |
| 001 | 00000012 | INBOX | 20081225 16:11:28 | NEW FUNCTIONS | /mailspool/a1225.eml | NORMAL | OPENED | |
| 001 | 00000013 | INBOX | 20081230 12:31:20 | Re: REPLY | /mailspool/a1230.eml | NORMAL | UNOPENED | |
| 013 | 00000005 | INBOX | 20081222 10:17:58 | THANK YOU | /mailspool/b1222.eml | NORMAL | OPENED | |
| 013 | 00000006 | INBOX | 20081225 11:31:23 | MEETING ROOM | /mailspool/b1225.eml | NORMAL | OPENED | |
| 013 | 00000007 | INBOX | 20090103 20:11:04 | TOMORROW'S SCHEDULE | /mailspool/b0103.eml | NORMAL | UNOPENED | |

| OPEN-MAIL SOURCE USER ID | OPEN-MAIL SOURCE MESSAGE ID | OPEN-MAIL TARGET USER ID | OPEN-MAIL-TARGET MESSAGE ID | DATE AND TIME OF BEING MADE OPEN | DATE AND TIME OF OPENING AT OPEN-MAIL TARGET | STATE | LATEST STATE UPDATE DATE AND TIME |
|---|---|---|---|---|---|---|---|
| | | | | | | | |

152f

STORAGE MEDIUM STORING A MAIL MANAGEMENT PROGRAM, AND MAIL MANAGEMENT APPARATUS AND METHOD

CROSS-REFERENCE TO RELATED APPLICATIONS

This application is based upon and claims the benefit of priority of the prior Japanese Patent Application No. 2009-61376, filed on Mar. 13, 2009, the entire contents of which are incorporated herein by reference.

FIELD

Embodiments discussed herein relate to a storage medium storing a mail management program for managing electronic mail, a mail management apparatus, and a mail management method.

BACKGROUND

With the widespread use of electronic mail, organizations such as national government departments, local government departments, and private companies use electronic mail to exchange information inside and outside the organizations. In such an organization, various sections have mail addresses of involved persons (hereinafter referred to as "personal addresses") and mail addresses of representatives of the organization or sub-groups in the organization (hereinafter referred to as "representative addresses"). The various sections may include sections that handle external contacts, such as support and customer contact services. Examples of the sub-groups include a division, a section, and a project team. The representative addresses are used as contact addresses for the entire organization or the sub-groups in the organization.

In connection to this, electronic mail including information to be shared between users in the same organization or sub-group may be delivered to a personal address of a user. The user transfers the electronic mail to the addresses of involved persons by using a mailing list service or the like. In addition, users use mailer software for performing processing such as sending and receiving electronic mail, managing electronic mail, and creating electronic mail.

For example, Japanese Unexamined Patent Application Publication No. 2001-222477 discloses an electronic mail message management system that allows content items of electronic mail messages to be collectively displayed in separate mail threads.

Furthermore, for example, Japanese Unexamined Patent Application Publication No. 2002-82876 discloses an electronic mail system in which electronic mail addressed to a representative address is delivered to a limited number of appropriate destinations to reduce the number of unnecessary receptions of electronic mail.

In addition to mailer software that allows a user to view electronic mail with an e-mail client installed on the user's machine, webmail software (hereinafter referred to as "webmail") that allows a user to view electronic mail using web browser software is also available. Webmail allows management of all messages on the server side, leading to high security.

SUMMARY

According to an aspect of the invention, a storage medium storing a mail management program, the mail management program causing a computer to execute an operation including: receiving from a first user, a designation of a first electronic mail addressed to the first user as an open mail, the first electronic mail is made open to a second user to be the open mail, first setting a receiving date and time at which the designation is received as first date and time information corresponding to the open mail, second setting another receiving date and time at which a second electronic mail is received by the computer as second date and time information corresponding to the second electronic mail, the second electronic mail is not the open mail and is also addressed to the second user, and upon receipt of an output instruction from the second user, outputting the open mail and the second electronic mail in accordance with the first and second date and time information, respectively.

It is to be understood that both the foregoing summary description and the following detailed description are exemplary and explanatory and are not restrictive of the invention, as claimed.

BRIEF DESCRIPTION OF DRAWINGS

FIG. 1 is a diagram illustrating an embodiment.

FIG. 2 is a diagram illustrating a system configuration according to an embodiment.

FIG. 3 is a diagram illustrating the hardware configuration of a mail server.

FIG. 4 is a block diagram illustrating the configuration of the mail server.

FIG. 5 is a diagram illustrating the data structure of a mail management table.

FIG. 6 is a diagram illustrating the data structure of an open-mail management table.

FIG. 9 is a flowchart illustrating the procedure of a user deletion process.

FIG. 11 is a diagram illustrating a mail management table obtained before an electronic mail message is made open.

FIG. 16 is a diagram illustrating an example of a mail management table obtained after an electronic mail message is made open.

FIG. 17 is a diagram illustrating an example of an open-mail management table obtained after an electronic mail message is made open.

FIG. 19 is a diagram illustrating an example of a received-mail display window obtained when an electronic mail message is made open, which is displayed to an open-mail target user.

FIG. 20 is a diagram illustrating an example of a mail management table obtained after an open-mail target user has opened a mail message.

FIG. 21 is a diagram illustrating an example of an open-mail management table obtained after an open-mail target user has opened a mail message.

FIG. 23 is a diagram illustrating an example of an already-read check window obtained when an electronic mail message is made open, which is displayed to an open-mail source user.

FIG. 24 is a diagram illustrating an example of a mail management table obtained after a mail message has been deleted by an open-mail target user.

FIG. 25 is a diagram illustrating an example of an open-mail management table obtained after an open-mail target user has deleted a mail message.

FIG. 26 is a diagram illustrating an example of an already-read check window obtained after a mail message has been deleted by an open-mail target user, which is displayed to an open-mail source user.

FIG. 28 is a diagram illustrating an example of a mail management table obtained after a mail message has been made non-open by an open-mail source user.

FIG. 29 is a diagram illustrating an example of an open-mail management table obtained after a mail message has been made non-open by an open-mail source user.

DESCRIPTION OF EMBODIMENTS

Figure 7A:
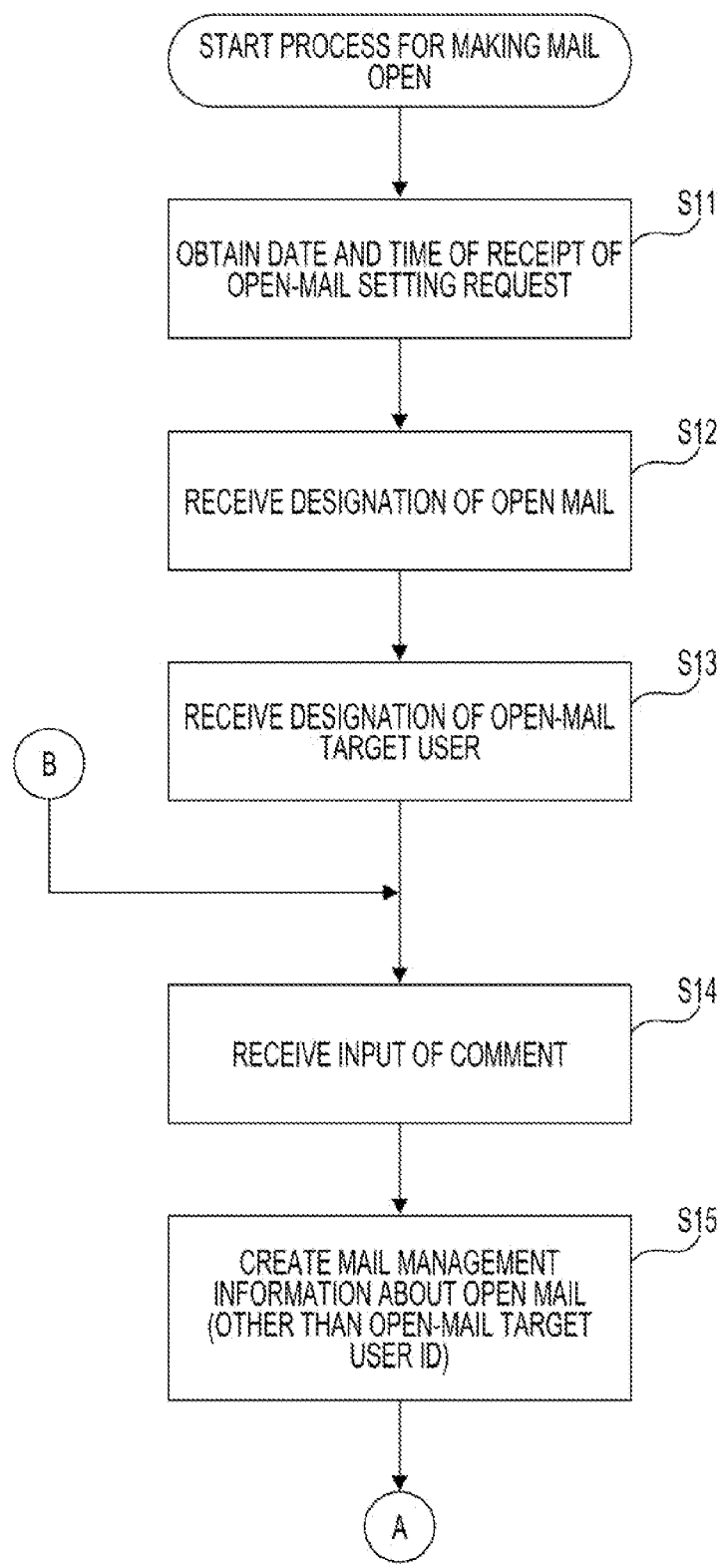
FIGS. 7A and 7B are flowcharts illustrating the procedure of a process for making mail open.

In a mail software example, wherein an e-mail service is accessed via an e-mail client, it is assumed that a user A may wish to make a mail message "a" open to other users B and C among electronic mail messages personally addressed to the user A. In this case, the mailer software described above transfers the mail message "a" received by the user A to the users B and C. Through this transfer process, the mailer software generates two new electronic mail messages that are based on the mail message "a", that is, a mail message "ab" addressed to the user B and a mail message "ac" addressed to the user C. Then, the mailer software delivers the generated mail messages to the users B and C.

That is, in the transfer process performed by the mailer software, the greater the number of addresses of users an electronic mail message is transferred to, the greater the number of electronic mail messages newly generated. Therefore, communication traffic is increased.

In contrast, in a webmail example, mail data for each user is managed on a webmail server. When a user A wishes to make a mail message "a", which has been delivered to the address of the user A, open to users B and C, the user A may give the users B and C permission to view the mail message "a". If the webmail server permits the users B and C to view the mail message "a" in accordance with the instruction of the user A, the users B and C could view the mail message "a" although the webmail server only has an amount of data corresponding to the amount of the mail message "a".

Specifically, the user A sets the received mail message "a" to "open" to the users B and C. Then, the webmail server sets permission for the other users B and C to view the open mail message "a".

The inbox for use with the mailer software or webmail is generally set in such a manner that messages are sorted by information indicating, for example, date and time such as the date and time of receipt in order to prevent unawareness of a newly arriving mail message. Newly arriving mail messages are collectively displayed on either the top or bottom of the sorted messages.

The mailer software described above generates a new mail message through the transfer process when the user of the mailer software makes a received mail message open. The mailer software sorts the new mail message by the date and time of receipt of the mail message by the users B and C to which the mail message is made open, thereby displaying the new mail message together with other newly arriving mail messages. The mailer software therefore does not cause inconvenience of unawareness of the new mail message because of the transfer process.

It is now assumed that a user A will make data indicating the content of an electronic mail message open to other users, i.e., users B and C, using the webmail without performing the transfer process. Since the webmail does not create a new electronic mail message, the open mail message is sorted by "the date and time of receipt by the user A who is the true recipient of the mail message".

For example, the user A sets an old mail message received a long time ago as an open mail message that is made open to the users B and C later using the webmail. In this case, if the open mail message is sorted by the date and time of receipt in the inboxes of the users B and C, the open mail message can be displayed separated from other newly arriving mail messages, and may be mixed up with old electronic mail messages received by the users B and C. This causes a risk that the users B and C will be unaware of the open mail message, and may be mixed up with old electronic mail messages received by the users B and C. This causes a risk that the users B and C will be unaware of the open mail message.

According to at least one embodiment as discussed herein, there is provided a medium storing a mail management program and a mail management apparatus and method that allow other users to be aware of an open mail message while avoiding an increase in communication traffic, a mail management apparatus, and a mail management method. For example, a webmail server may further set a view setting for the users B and C so that the open mail message "a" can appear as a newly arriving mail message in inboxes of the users B and C. The webmail can therefore prevent an increase in the communication traffic caused by making a mail message open to other users.

FIG. 1 is a diagram illustrating an embodiment. Referring to FIG. 1, a mail management apparatus 1 manages an open mail message to be shared between a plurality of users among electronic mail messages personally addressed to a user. The mail management apparatus 1 includes a mail setting receiving unit 1a, a date-and-time information setting unit 1b, a mail setting unit 1c, a mail providing unit 1d, a mail information storage unit 1e, and a mail setting information storage unit 1f. The mail management apparatus 1 may be a computer, and the computer may execute a mail management program, thereby achieving the following functions.

The mail setting receiving unit 1a receives the setting of a first electronic mail message that is made open among electronic mail messages addressed to an open-mail source user serving as a first user from the open-mail source user. The mail setting receiving unit 1a also receives, from the open-mail source user, a designation of an open-mail target user serving as a second user to which the open mail message is made open. For example, the open-mail source user operates an information processing device (not illustrated) that is operated by the user to set an open mail message. The information processing device is connected to the mail management apparatus 1 via a communication line (not illustrated). Information about the setting of an open mail message, which is performed by the open-mail source user, is sent to the mail management apparatus 1 via the communication line, and is received by the mail setting receiving unit 1a. The term "electronic mail message", as used herein, includes both an open mail message and a normal electronic mail message other than the open mail message.

The date-and-time information setting unit 1b sets date and time information about a second electronic mail message that has been received by the mail management apparatus 1 and that is addressed to the open-mail target user in such a manner that the date and time information indicates the date and time at which the mail management apparatus 1 receives the second electronic mail message. The date-and-time information setting unit 1b also sets date and time information about the open mail message in such a manner that the date and time information indicates the date and time at which the mail setting receiving unit 1a receives the setting of the open mail message that is addressed to the open-mail target user. In other words, date and time information is information indicating the date and time of receipt of the electronic mail message or the date and time of receipt of the setting of the open mail message. In the embodiment, the date and time information about the open mail message is set so as to indicate the date and time at which the open mail message is set by the open-mail source user. A described above, the date and time information about an electronic mail message other than the open mail message is set so as to indicate the date and time of receipt at which the electronic mail message is received by the mail management apparatus 1.

The mail setting unit 1c generates mail setting information, and stores the generated mail setting information in the mail setting information storage unit 1f. The mail setting information may be information including electronic mail messages received by the mail setting receiving unit 1a and date and time information set by the date-and-time information setting unit 1b. In other words, the mail setting information may be information including an open mail message and date and time information about the open mail message, or information including an electronic mail message other than the open mail message and date and time information about the electronic mail message other than the open mail message.

The mail providing unit 1d receives an output instruction from the open-mail target user. Then, the mail providing unit 1d obtains, from the mail information storage unit 1e, mail information indicating the content of the open mail message and mail information indicating the content of the second electronic mail message. The mail providing unit 1d refers to the mail setting information storage unit 1f on the basis of the obtained mail information. Then, the mail providing unit 1d generates mail providing information for displaying electronic mail messages in such a manner that the electronic mail messages are arranged by the date and time of receipt indicated by the date and time information included in the mail setting information, and outputs the mail providing information. On the basis of the mail providing information output from the mail providing unit 1d, for example, the information processing device connected to the mail management apparatus 1 via the communication line (not illustrated) displays the open mail message on a mail display screen 3.

The mail information storage unit 1e stores mail information indicating the content of an electronic mail message addressed to a user. The mail information includes, for example, text information about the body of the electronic mail message, header information, an attached file, and any other suitable data.

The mail setting information storage unit 1f stores mail setting information for managing the open mail message and electronic mail messages other than the open mail message. The mail setting information may be information used to provide a user with an electronic mail message such as the open mail message, and includes, for example, information indicating the source of the electronic mail message and the target of the electronic mail message. The information about the source of the electronic mail message may be information indicating a user who has made the electronic mail message open when the electronic mail message is an open mail message. The information about the destination of the electronic mail message may be information indicating an open-mail target user when the electronic mail message is an open mail message. The mail setting information further includes the date and time information described above. Once the electronic mail message is an open mail message, the mail setting information includes information indicating the electronic mail message or the like that the open mail message is based on.

According to the mail management apparatus 1, the mail setting receiving unit 1a receives the setting of an open mail message. The date-and-time information setting unit 1b sets date and time information about the second electronic mail message so as to indicate the date and time at which the second electronic mail message is received. The date-and-time information setting unit 1b also sets date and time information about the open mail message so as to indicate the date and time at which the open mail message is set. The mail setting unit 1c generates mail setting information, and the mail setting information is stored in the mail setting information storage unit 1f. When an output instruction from an open-mail target user is received, the mail providing unit 1d obtains mail information indicating the content of the open mail message and mail information indicating the content of electronic mail messages other than the open mail message. The mail providing unit 1d outputs mail providing information for displaying the open mail message and the electronic mail messages other than the open mail message in such a manner that the open mail message and the electronic mail messages other than the open mail message are arranged in accordance with the date and time information on the basis of the obtained mail information.

With the above configuration, for an open mail message, date and time information indicating the date and time of receipt, which the sorting operation during display is based on, is newly set. The newly set open mail message, when sorted on the basis of the configured date and time information, is displayed in a manner similar to that of other newly arriving mail messages. The mail management apparatus 1 may therefore prevent the newly configured open mail message from being mixed up with other mail messages. In other words, the mail management apparatus 1 may avoid a risk that a destination user will be unaware of the new open mail message.

The embodiment will now be described in detail with reference to the drawings.

FIG. 2 is a diagram illustrating a system configuration according to the embodiment. A mail system illustrated in FIG. 2 may be a system in which electronic mail is sent and received inside an organization 30 and in which electronic mail is sent and received between the organization 30 and a plurality of information processing devices located outside the organization 30. Terminal devices 21, 22, and 23 are illustrated as examples of the plurality of information processing devices located outside the organization 30.

As referred herein, for example, in a company, one department may be handled as an organization, or the entire company may be handled as an organization. In addition, a plurality of departments may be combined into a single unit, for convenience of description, which may be handled as an organization. Likewise, in a local public entity, one section may be handled as an organization, or the entity itself may be handled as an organization. In addition, a plurality of sections may be combined into a single unit, for convenience of description, which may be handled as an organization.

In the mail system according to the embodiment, terminal devices 31 and 32 serving as information processing devices located inside the organization 30 are connected to a mail server 100 configured to manage electronic mail via a local area network (LAN) 10. The mail server 100 may also be connected to the terminal devices 21, 22, and 23 located outside the organization 30 via the Internet 20.

The mail server 100 may be a mail server configured to send and receive electronic mail inside the organization 30 and to send and receive electronic mail between devices inside and outside the organization 30. The mail server 100 may also be configured to manage electronic mail messages, mail accounts, and the like inside the organization 30.

The mail server 100 has a function for storing an internal mail message created by a user belonging to the organization 30 by using a browser on the terminal device 31 or 32. The mail server 100 also has a function for receiving an electronic mail message sent to the organization 30 from outside the organization 30 via the Internet 20 and storing the electronic mail message.

The mail server 100 also has a function for operating an electronic mail message stored in a mail information storage unit 160 (see FIG. 4) as a webmail message in accordance with a request of a user who is a recipient of the electronic mail message by using the browser on the terminal device 31 or 32. The term "operating an electronic mail message", as used herein, refers to an electronic mail management operation including creating and sending a new electronic mail message, browsing a received or sent electronic mail, creating a reply to a received electronic mail message, deleting a received or sent electronic mail message from a corresponding account, and temporarily saving an electronic mail message being created.

In order to operate an electronic mail message, a user is prompted to enter a user ID and a password through the browser on the terminal device 31 or 32. Once the entered user ID and password match authentication information registered in advance, the user is permitted to operate an internal mail message written to the user inside the organization 30 and an external mail message sent to the user from outside the organization 30. During the operation of an electronic mail message, the mail server 100 sends information indicating the content of the electronic mail message operated by the user to the browser on the terminal device operated by the user, for example, the terminal device 31, via the LAN 10. Upon receipt of the information indicating the content of the electronic mail message, the terminal device 31 displays the content of the electronic mail message on the browser of the terminal device 31. The user operates the electronic mail message on the basis of the content of the electronic mail message displayed on the browser.

The mail server 100 further has a function for sending an electronic mail message created using the browser on the terminal device 31 or 32 to outside via the Internet 20. In order to send an electronic mail message, the mail server 100 receives a request from a user for creating and sending an electronic mail message in accordance with the Hypertext Transfer Protocol (HTTP). Then, the mail server 100 sends the electronic mail message the destination specified by the user, for example, to the address of the user of the terminal device 21, in accordance with the Simple Mail Transfer Protocol (SMTP) and the Post Office Protocol (POP) or the Internet Message Access Protocol (IMAP).

Here, in the embodiment, an electronic mail message that is stored under the control of the mail server 100 and that may be operated through web browsers on devices, such as the terminal devices 31 and 32 inside the organization 30, is referred to as a "webmail message." In addition to an internal mail message given below, an external mail message sent to the mail server 100 from outside the organization 30 may also be operated, such as being viewed via a web browser, by a user inside the organization 30 as a webmail message.

A user belonging to the organization 30 may also be allowed to view an electronic mail message by the mail system by accessing the mail server 100 from an external terminal device (not illustrated) outside the organization 30 via the Internet 20. In this case, the user belonging to the organization 30, as with the terminal device 31 or 32 inside the organization 30, is authenticated through a user ID and a password using a terminal device that is outside the organization 30 and that is connected to the Internet 20, and then logs in. Therefore, a user belonging to the organization 30 is allowed to view an electronic mail message received at a representative address even when the user is outside the organization 30.

An electronic mail message created using the terminal device 31 or 32 inside the organization 30 and exchanged between users inside the organization 30 is referred to as an "internal mail message". In contrast, an electronic mail message exchanged between users inside and outside the organization 30 via the Internet 20 and through the mail server 100 is referred to as an "external mail message".

In the embodiment, the term "electronic mail message" includes both an internal mail message and an external mail message, and also includes a webmail message. In the embodiment, furthermore, the term "open mail message" is handled as a kind of an "internal mail message". The term "electronic mail message" therefore includes both an "open mail message", which serves as a webmail message that is made open to an open-mail target user, and a "normal electronic mail message" other than the open mail message.

An internal mail message, including an open mail message, is created using the browser on the terminal device 31 or 32 inside the organization 30. The created internal mail message is stored as a webmail message in the mail server 100, and only a user who logs in using an account inside the organization 30 that is set as the destination of the internal mail message is allowed to operate the internal mail message using the browser on the terminal device 31 or 32 inside the organization 30.

For example, a case where a user wishes to make an electronic mail message, which is addressed to his/her personal address, open to other users will now be described. The electronic mail message addressed to the personal address may be either an external mail message or an internal mail message. In this case, the user operates the terminal device 31 and notifies the mail server 100 of a designation of the electronic mail message. The user also designates an open-mail target user who is the party to which the electronic mail message is made open, and sets the electronic mail message as an open mail message. Note that the open mail message is processed as an internal mail message.

A user inside the organization 30 may use this webmail function to share the content of an electronic mail message with other users through open mail. In this manner, the mail server 100 of the embodiment sends and receives electronic mail inside and outside the organization 30 and also manages the electronic mail. The mail server 100 of the embodiment may also send electronic mail in such a manner that destinations located inside and outside the organization 30 are included in the same electronic mail.

In the embodiment, furthermore, the mail server 100 manages an external mail message and an internal mail message in terms of the sender without distinguishing them from each other. Here, during an operation by a user using the terminal device 31 or 32, both messages are displayed at the same time. However, the embodiment is not limited thereto, and an external mail message and an internal mail message may be managed separately as desired, and may also be separately displayed. In addition, the mail server 100 may handle only an external mail message or may handle only an internal mail message.

In the embodiment, the mail server 100 further has a function for managing a webmail message such as an open mail message. However, the embodiment is not limited thereto, and an independent apparatus different from the mail server 100, such as a dedicated webmail server, may have a function for managing a webmail message. A shared apparatus having a further different function, such as a server, may also have a function for managing a webmail message.

The terminal device 21, 22, and 23 may be computers located outside the organization 30 in order to allow a user outside the organization 30 to operate an electronic mail message. Each of the terminal devices 21, 22, and 23 has a function for operating and displaying an electronic mail message.

The terminal devices 31 and 32 may be computers located inside the organization 30 in order to allow a user inside the organization 30 to utilize webmail provided by the mail server 100. Each of the terminal devices 31 and 32 has a function for using webmail provided by the mail server 100 and also has a function for operating the mail server 100 to send and receive an electronic mail message from the mail server 100 to outside the organization 30 via the Internet 20.

Next, the hardware configuration of the mail server 100 will be described.

FIG. 3 is a diagram illustrating the hardware configuration of the mail server 100. The mail server 100 includes a central processing unit (CPU) 101 configured to control the overall operation of the mail server 100. The CPU 101 is connected to a random access memory (RAM) 102, a hard disk drive (HDD) 103, a graphic processing device 104, an input interface 105, and a communication interface 106 via a bus 107.

The RAM 102 temporarily stores an operating system (OS) program to be executed by the CPU 101 or at least some of application programs. The RAM 102 also stores various data for the CPU 101 to perform processing. The HDD 103 stores OS and application programs.

The graphic processing device 104 is connected to a monitor 11. The graphic processing device 104 causes an image to be displayed on a screen of the monitor 11 in accordance with an instruction from the CPU 101. The input interface 105 is connected to a keyboard 12 and a mouse 13. The input interface 105 delivers a signal sent from the keyboard 12 or the mouse 13 to the CPU 101 via the bus 107.

The communication interface 106 is connected to networks such as the LAN 10 and the Internet 20. The communication interface 106 sends and receives data to and from other computers via the networks.

With the hardware configuration described above, the process functions of the embodiment may be achieved.

Next, the configuration of a mail server 100 having the functions of the mail management apparatus 1 will be described with respect to another embodiment. FIG. 4 is a block diagram illustrating the configuration of the mail server 100. The mail server 100 of the embodiment is configured to send and receive an electronic mail message and also to manage open mail to be shared between a plurality of users among electronic mail messages personally addressed to a user. The mail server 100 includes a mail designation receiving unit 111, an open-mail-target designation receiving unit 112, a mail setting unit 113, a mail providing unit 114, a date-and-time information setting unit 115, a comment receiving unit 121, a mail providing request receiving unit 122, a mail operation receiving unit 123, a mail state providing unit 124, a mail setting information storage unit 150, and a mail information storage unit 160. The mail setting information storage unit 150 has a mail management information storage unit 151 and an open-mail management information storage unit 152.

The mail server 100 is connected to a terminal device 31, which may be used by a user to manage electronic mail, via a LAN 10, and is also connected to external terminal devices 21, 22, and 23 via the Internet 20 (see FIG. 2).

The mail designation receiving unit 111 and the open-mail-target designation receiving unit 112 receive a designation of an open mail message that an open-mail source user who is the user makes open to an open-mail target user who is another user. It is assumed herein that the open-mail source user wishes to set a certain electronic mail message as an open mail message among electronic mail messages addressed to and received by the open-mail source user so as to make the open mail message open to the open-mail target user. In this case, the open-mail source user operates the terminal device 31 described with reference to FIG. 2, which is connected to the mail server 100 via the LAN 10 and is operated by the open-mail source user, to set an open mail message. The mail designation receiving unit 111 receives a designation of the open mail message from, for example, the terminal device 31. Accordingly, a designation of which electronic mail message is to be set as an open mail message that is made open to other users among electronic mail messages addressed to a given user may be received from the given user.

The open-mail-target designation receiving unit 112 receives a designation of an open-mail target user from, for example, the terminal device 31.

The mail setting unit 113 generates mail setting information, and stores the mail setting information in the mail setting information storage unit 150. The mail setting information may be information including the open mail message, the open-mail target user, and the date and time of sending/receipt. The date and time of sending/receipt serves as date and time information described below.

Here, the mail setting unit 113 sets mail path information in the generated mail setting information. The mail path information may indicate the path of mail information corresponding to the open mail message. When a comment is input from the comment receiving unit 121, the mail setting unit 113 generates comment information on the basis of the input comment, and sets the generated comment information in comment information included in the mail setting information about the open mail message.

The mail providing unit 114 obtains mail information that is provided from the mail information storage unit 160 to the open-mail target user on the basis of the mail setting information stored in the mail setting information storage unit 150. In this case, the mail providing unit 114 obtains mail information indicating the content of the open mail message addressed to the open-mail target user, and mail information indicating the content of electronic mail messages other than the open mail message addressed to the open-mail target user.

Then, the mail providing unit 114 outputs, on the basis of the obtained mail information, mail providing information for displaying electronic mail messages so as to be arranged in accordance with the mail setting information and displaying the open mail message together with the comment to the open mail message.

On the basis of the mail information output from the mail providing unit 114, the open mail message is displayed on a monitor (not illustrated) connected to, for example, the terminal device 31 that is operated by the open-mail target user and that is connected to the mail server 100 via the LAN 10.

The mail providing unit 114 obtains the mail information about the open mail message, which indicates the content of the open mail message, using the mail path information included in the mail setting information about the open mail message addressed to the designated open-mail target user.

Specifically, in accordance with a mail providing request from the user, the mail providing unit 114 obtains mail information about the open mail message addressed from the mail information storage unit 160 to the open-mail target user on the basis of the mail setting information about the open mail message addressed to the open-mail target user. Then, the mail providing unit 114 obtains mail information indicating the content of the original electronic mail message that the open mail message is based on using the mail path included in the mail setting information.

The date-and-time information setting unit 115 sets, as the date and time of sending/receipt of the electronic mail message addressed to the open-mail target user, the date and time of receipt at which the electronic mail message is received by the mail server 100. The date-and-time information setting unit 115 also sets, as the date and time of sending/receipt of the open mail message, the date and time at which the open mail message is set by the mail designation receiving unit 111 and the open-mail-target designation receiving unit 112. As described previously, since the date and time of sending/receipt serves as date and time information, the date-and-time information setting unit 115 sets the date and time information included in the mail setting information for each electronic mail message.

The comment receiving unit 121 receives an input comment to the open mail message that is made open. An input of a comment will be described in detail with respect to a comment input window 193 illustrated in FIG. 15.

The mail providing request receiving unit 122 receives a mail providing request for requesting provision of mail information addressed to the open-mail target user from all users including the open-mail target user. The mail providing request is made in order to allow the open-mail target user to view the electronic mail message addressed to the open-mail target user.

The mail server 100 provides electronic mail messages including the open mail messages in response to the mail providing request of the open-mail target user. Thus, even in a case where the open-mail target user does not have an intention to voluntarily acquire shared information, periodic checking of electronic mail messages or any other suitable operation allows the open-mail target user to know the presence of an open mail message to be shared which is set by the open-mail source user.

The mail providing request may be entered by the open-mail target user using the terminal device 32. The mail providing request entered into the terminal device 32 is sent from the terminal device 32 to the mail server 100 via the LAN 10.

The mail operation receiving unit 123 receives, from the user, a date-and-time ordering operation for arranging electronic mail messages by the date and time of sending/receipt. The date-and-time ordering operation is performed by, for example, the open-mail target user using sorting buttons 275b1 to 275b3 described below with reference to FIG. 19.

The mail operation receiving unit 123 also receives an opening operation for allowing a user to open an electronic mail message. In accordance with the received opening operation, the mail operation receiving unit 123 sets a mail-opened flag included in the mail setting information to the state of being opened by the user. This allows, for example, mail status information stored in the mail server 100 to reflect the open mail opening operation performed by the open-mail target user.

Here, the opening of an electronic mail message is detected, for example, when the user performs an operation on an electronic mail message managed by the mail server 100 to display the content of the electronic mail message on a monitor connected to the terminal device 32. An electronic mail message that has been opened is regarded as having been read by the user.

The mail operation receiving unit 123 receives a state request for requesting provision of mail setting information indicating whether or not the open mail message has been opened by the open-mail target user from the open-mail source user. The state request may be entered by the open-mail source user using the terminal device 31. The state request entered into the terminal device 31 is sent from the terminal device 31 to the mail server 100 via the LAN 10.

Upon receipt of the state request, the mail state providing unit 124 refers to the mail setting information storage unit 150, and obtains a mail-opened flag and open-mail-target opening date-and-time information. The mail-opened flag may indicate whether or not the open mail message has been opened by open-mail target user. The open-mail-target opening date-and-time information may indicate the date and time at which the open mail message is opened by the open-mail target. The mail state providing unit 124 provides the obtained open-mail-target opening date-and-time information.

The mail setting information storage unit 150 stores mail setting information for managing the open mail message and electronic mail messages other than the open mail message. The mail setting information storage unit 150 is provided with the mail management information storage unit 151 and the open-mail management information storage unit 152. The mail management information storage unit 151 stores mail management information for managing electronic mail messages, which will be described below with reference to FIG. 5. The open-mail management information storage unit 152 stores open-mail management information for managing an open mail message that is made open, which will be described below with reference to FIG. 6.

The mail information storage unit 160 stores mail information indicating the content of an electronic mail message. The mail information may be, for example, information about an internal mail message that is created using a browser on a terminal device inside the organization 30, such as the terminal device 31, and that is delivered via the LAN 10 and an external mail message that is sent from outside the organization 30 via the Internet 20 connected to the mail server 100. The mail information includes the mail body and header information. The header information includes information such as the source or sender, the destination or recipient, and the date and time of sending, an attached file, and any other suitable data.

While in the embodiment, the mail server 100 has the functions described above, an independent apparatus different from the mail server 100, such as a dedicated server, may have all the functions described above. Alternatively, each of a plurality of apparatuses including the mail server 100 may have some of the functions described above, and the entirety of the plurality of apparatuses may achieve the functions described above.

Next, a table used in the embodiment will be described.

FIG. 5 is a diagram illustrating the data structure of a mail management table 151a. The mail management table 151a illustrated in FIG. 5 is stored in the mail management information storage unit 151 included in the mail setting information storage unit 150, and is created and managed by the mail server 100. The mail management table 151a may be a table storing mail management information for managing electronic mail messages inside the organization 30.

The mail management table 151a has the following items: "user ID", "message ID", "folder", "date and time of sending/receipt", "subject", "mail path", "mail type", "mail-opened flag", and "comment". In the mail management table 151a, pieces of information arranged in a horizontal row with respect to the above items are associated with one another as mail management information.

The mail server 100 creates mail management information included in each row of the mail management table 151a each time an external mail message sent from outside the organization 30 is received, each time an internal mail message is created inside the organization 30, and each time an open mail message is set based on an external mail message sent from outside the organization 30 and an internal mail message created inside the organization 30.

The user ID may be an index assigned to each user to identify the user on a mail system such as the mail server 100. Each user ID may be any desired character string defined to uniquely specify a user.

The message ID may be an index uniquely assigned by the mail server 100 to every electronic mail message received by the mail server 100 on the mail system to uniquely specify the electronic mail message. Like the user ID, each message ID may also be any desired character string. When the external mail message is received by the mail server 100 via the Internet 20, a message ID is assigned to an external mail message. When an internal mail message created using the terminal device 31 or 32 and sent to the mail server 100 via the LAN 10 is stored in the mail server 100, a message ID is assigned to the internal mail message.

The folder may indicate a folder into which a received electronic mail message is moved by the mail server 100. Examples of folders into which electronic mail messages are moved include an "inbox" into which a normal mail message is moved, and an "open mail" folder into which an open mail message is moved.

The date and time of sending/receipt may indicate the date and time at which an electronic mail message is handled such as being sent or received. When the electronic mail message is an open mail message that is made open by an open-mail source user, the date and time of sending/receipt may be set to the date and time at which the open-mail source user starts the operation of setting an open mail message, for example, the date and time at which the open-mail source user invokes a function for making an electronic mail message open by operating the mail system.

The subject may be a title given to an electronic mail message by the sender. The subject is displayed when a user displays a mail message on a mail display window.

The mail path may be a path along which mail information serving as data indicating the content of an electronic mail message, such as text, is stored in the mail information storage unit 160.

The mail type may indicate whether an electronic mail message is an open mail message or a non-open or normal mail message. An electronic mail message having a mail type "open" is an open mail message. An electronic mail message having a mail type "normal" is a normal mail message.

The mail-opened flag may indicate whether or not an electronic mail message has been opened. An electronic mail message having a mail-opened flag "opened" has been opened by a destination user. An electronic mail message having a mail-opened flag "unopened" has not yet been opened by a destination user. The use of the mail-opened flag allows estimation of whether or not a mail message has been read by a destination user.

The comment may be a comment created by an open-mail source user who has made an open mail message open. A comment about an open mail message may be presented together with the open mail message from the open-mail source user to an open-mail target user who is the destination user of the open mail message.

FIG. 6 is a diagram illustrating the data structure of an open-mail management table 152a. The open-mail management table 152a illustrated in FIG. 6 is stored in the open-mail management information storage unit 152 included in the mail setting information storage unit 150, and is created and managed by the mail server 100. The open-mail management table 152a may be a table storing open-mail management information for managing an open mail message that is made open by a user inside the organization 30.

The open-mail management table 152a has the following items: "open-mail source user ID", "open-mail source message ID", "open-mail target user ID", "open-mail target message ID", "date and time of being made open", "date and time of opening at open-mail target", "state", and "latest state update date and time". In the open-mail management table 152a, pieces of information arranged in a horizontal row with respect to the above items are associated with one another as open-mail management information.

The mail server 100 creates open-mail management information included in each row of the open-mail management table 152a each time an open mail message is set based on an external mail message sent from outside the organization 30 and an internal mail message created inside the organization 30.

The open-mail source user ID may be a user ID for specifying a user who has set an open mail message on a mail system such as the mail server 100.

The open-mail source message ID may be a message ID assigned by the mail server 100 to an original electronic mail message that the open mail message is based on. The original electronic mail message may be an external mail message or an internal mail message. In addition, an open mail message may also be set based on the open mail message. In other words, an open-mail target user who has read the open mail message may be allowed to further make an open mail message open to any other user as an open mail message.

The open-mail target user ID may be a user ID for specifying a user who is set as the destination of the open mail message by the open-mail source user. The open-mail target message ID may be a message ID assigned to the open mail message by the mail server 100.

The date and time of being made open may indicate the date and time at which the open mail message is made open by the open-mail source user. The date and time of being made open is set to the date and time at which the open-mail source user performs an operation on the open mail message so as to make the open mail message open. The date and time of opening at open-mail target may indicate the date and time at which the open mail message is opened by the open-mail target user.

The state may indicate the current state of the open mail message. For example, an open mail message having a state "currently open" has been made open. An open mail message having a state "deleted" has been deleted by the open-mail target user. In the embodiment, when an open mail message is deleted or made non-open by the open-mail source user, the open-mail management information about the open mail is deleted. However, the settings of the "state" item to be stored are not to be limited thereto. For example, a "non-open" setting or any other setting may be provided as a setting of the "state" item, and may be set for an open mail message without, for example, deleting open-mail management information thereabout to indicate that the open mail message is not currently open. The latest state update date and time may indicate the date and time at which the state of an open mail message is last changed by operating the open mail message by the open-mail source user or the like.

The mail management information described above with reference to FIG. 5 and the open-mail management information described above with reference to FIG. 6 may serve as the mail setting information described above with reference to FIG. 4. In the embodiment, mail management information and open-mail management information, which may serve as mail setting information, are separately set. However, the mail management information and the open-mail management information may serve to provide a single piece of mail setting information, or more than two pieces of information may serve to provide e-mail setting information.

Next, processes executed in the embodiment will be described.

Figure 7B:
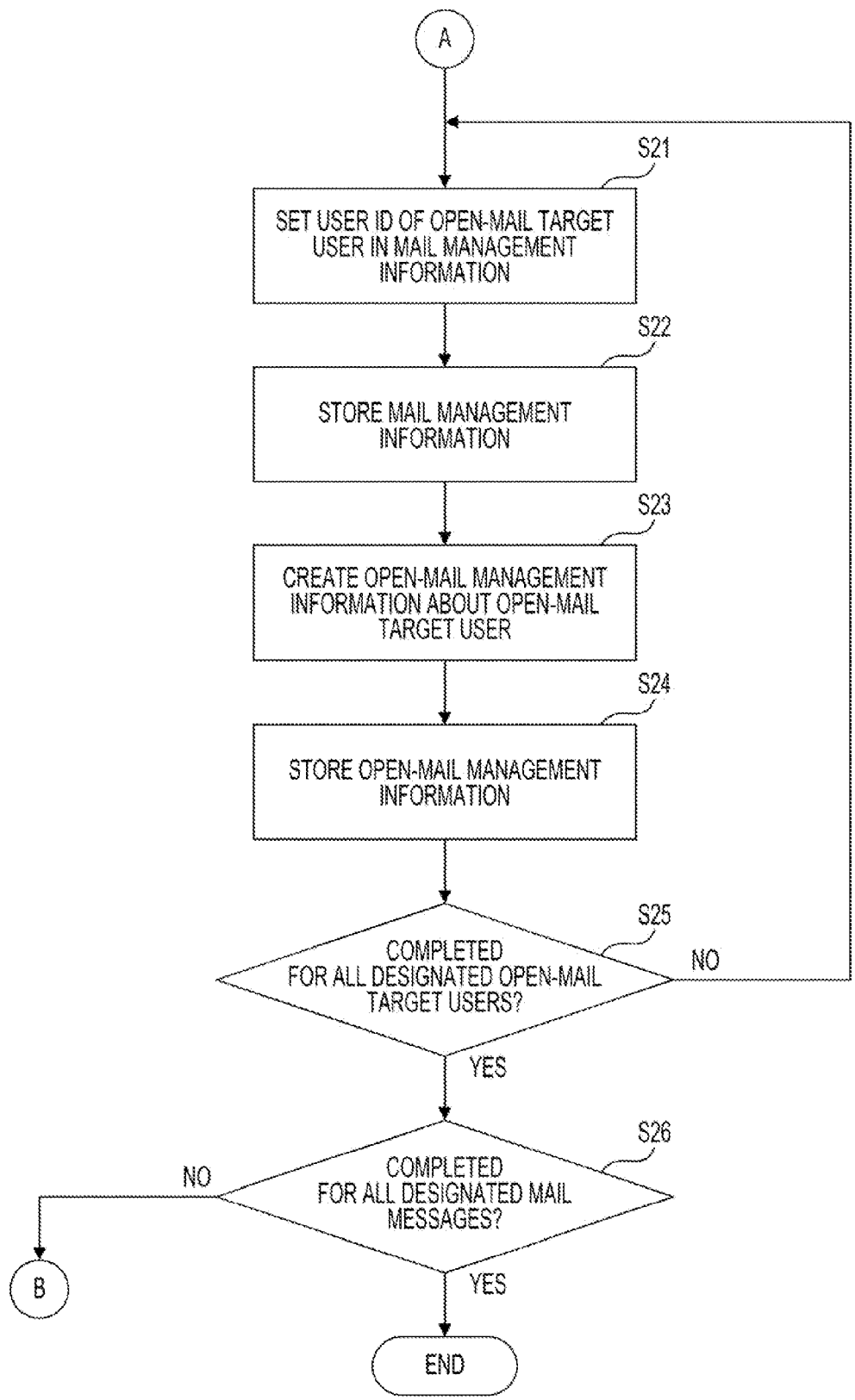

FIGS. 7A and 7B are flowcharts illustrating the procedure of a process for making mail open. The process for making mail open illustrated in FIGS. 7A and 7B may be a process for setting an electronic mail message as an open mail message that is made open to other users in response to an operation by an open-mail source user. The execution of the process for making mail open is started by the mail server 100 when the mail server 100 receives an open-mail setting request sent from the terminal device 31 or 32 used by a user belonging to the organization 30.

[At S11] The mail setting unit 113 obtains the date and time of receipt of an open-mail setting request. The date and time of receipt is handled by the mail providing unit 114 or the like as the date and time at which the open-mail source user starts the operation of making a given electronic mail message open.

[At S12] The mail designation receiving unit 111 receives mail designation information indicating a designation of an electronic mail message that is made open by the open-mail source user from the terminal device 31. The mail designation information may be, for example, a message ID. In this case, the open-mail source user may designate a plurality of electronic mail messages as an open mail message in a single process.

[At S13] The open-mail-target designation receiving unit 112 receives open-mail-target designation information indicating an open-mail target user to which the open mail message is made open by the open-mail source user from the terminal device 31. The open-mail-target designation information may be, for example, a user ID. In this case, the open-mail source user may designate a plurality of open-mail target users in a single process.

[At S14] The comment receiving unit 121 receives information indicating a comment to the open mail message, which is input by the open-mail source user, from the terminal device 31.

[At S15] The mail setting unit 113 creates mail management information about the electronic mail message designated in the mail designation information received in S12. Then, the process proceeds to S21 (FIG. 7B). The mail setting unit 113 sets the date and time of receipt obtained in S11 as the date and time of sending/receipt of the open mail message in the mail management information. As described previously, the date and time of sending/receipt serves as date and time information.

[At S21] The mail setting unit 113 sets, in the mail management information created in S15, the user ID of the open-mail target user designated in the open-mail-target designation information received in S13.

[At S22] The mail setting unit 113 causes the mail management information in which the user ID of the open-mail target user is set in S21 to be stored in the mail management information storage unit 151.

[At S23] The mail setting unit 113 creates open-mail management information about the open mail designated in the mail designation information received in S12 for the open-mail target users designated in the open-mail-target designation information received in S13. In this case, the mail setting unit 113 creates the open-mail management information on the basis of the mail management information about the open mail message.

[At S24] The mail setting unit 113 causes the open-mail management information created in S23 to be stored in the open-mail management information storage unit 152.

[At S25] The mail setting unit 113 determines whether or not the operation of creating and storing mail management information and open-mail management information about the open mail message has been completed for all the open-mail target users designated in the open-mail-target designation information received in S13. When the operation has been completed for all the designated open-mail target users, the process proceeds to S26. When the operation has not been completed for all the designated open-mail target users, the process proceeds to S21. In this manner, when a plurality of open-mail target users are designated by the open-mail source user, the processing of S21 to S24 is repeatedly performed until the processing has been completed for all the users.

[At S26] The mail setting unit 113 determines whether or not the operation of creating and storing mail management information and open-mail management information about an open mail message has been completed for all the open mail messages designated in the mail designation information received in S12. When the operation has been completed for all the open mail messages, the process ends. When the operation has not been completed for all the open mail messages, the process proceeds to S14. In this manner, when a plurality of electronic mail messages are designated as objects to be made open by the open-mail source user, the processing of S14 to S25 is repeatedly performed by the mail setting unit 113 until the processing has been completed for all the open mail messages.

In the process for making mail open according to the embodiment, the same open-mail target user is designated for all electronic mail messages. Alternatively, in a case where a plurality of electronic mail messages are designated as open mail messages, different open-mail target users may be designated for the individual open mail messages. Therefore, the process may be applied to the case where different open-mail target users are set for individual open mail messages.

Figure 8A:
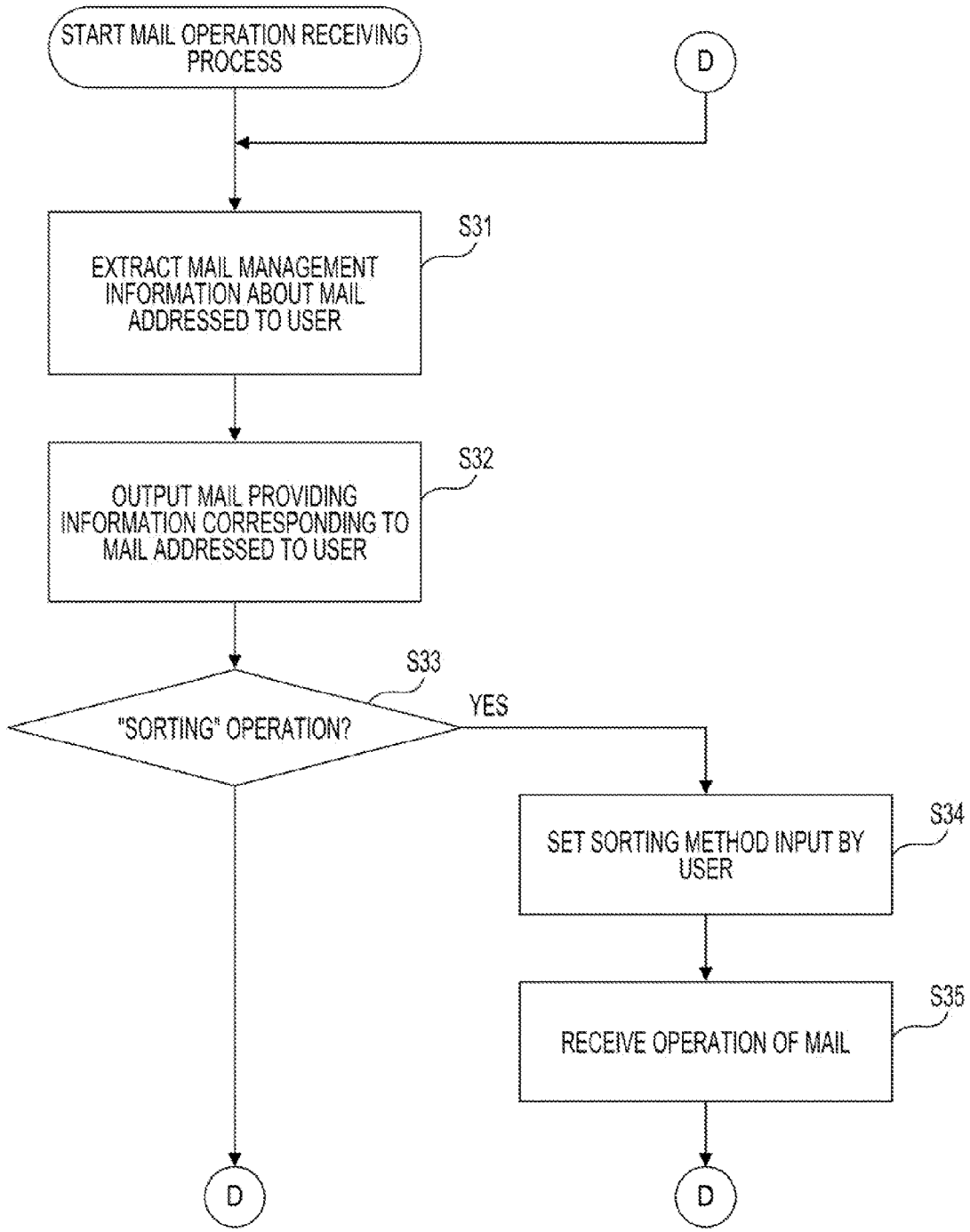
FIGS. 8A and 8B are flowcharts illustrating the procedure of a mail operation receiving process.
Figure 8B:
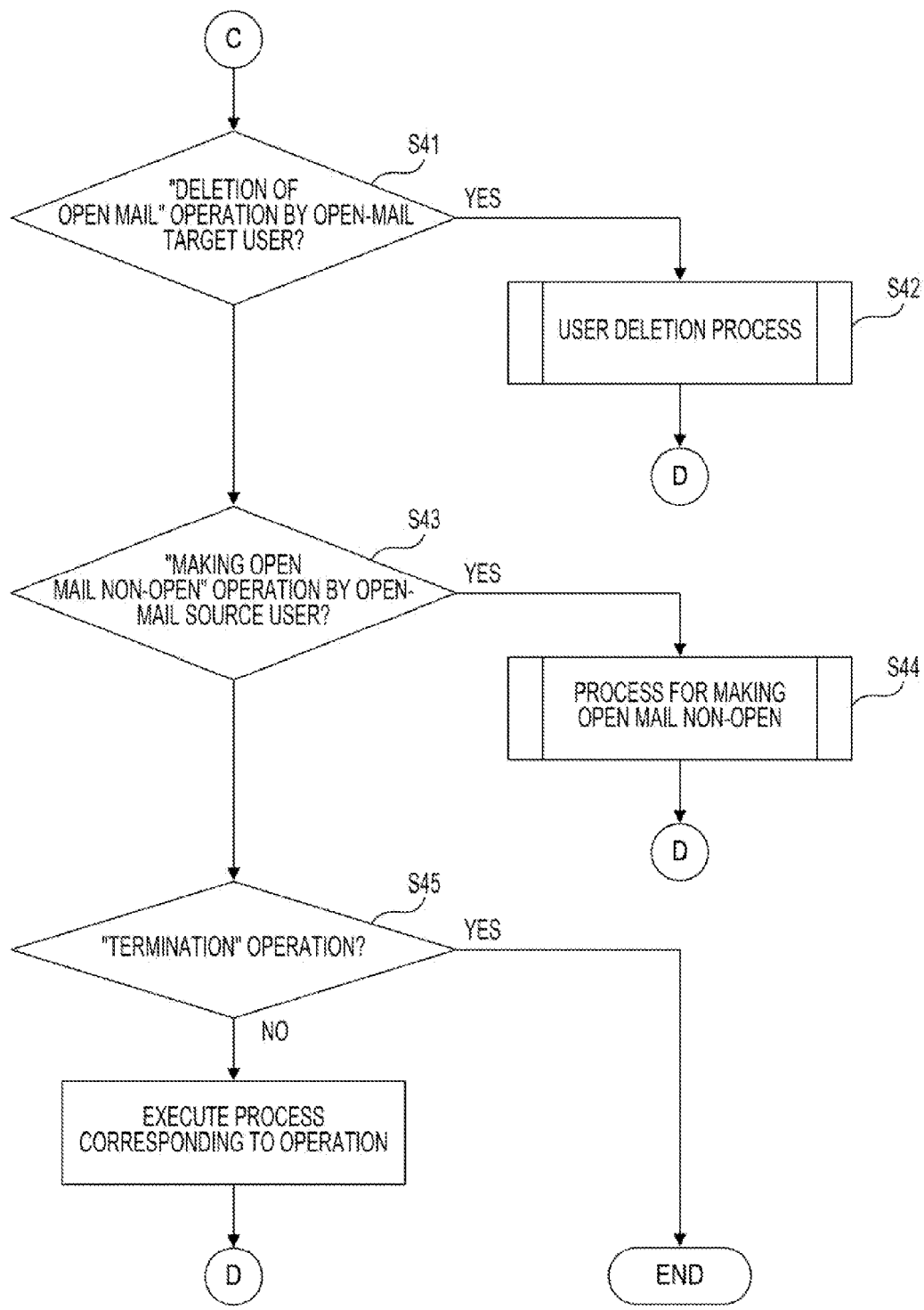

FIGS. 8A and 8B are flowcharts illustrating the procedure of a mail operation receiving process. The mail operation receiving process illustrated in FIG. 8B includes receiving requests from users including an open-mail source user and an open-mail target user, and providing electronic mail messages addressed to the users, including an open mail message and an electronic mail message other than the open mail message. The mail operation receiving process further includes receiving an operation for the provided electronic mail messages. The mail operation receiving process is started, for example, when a certain operation for an electronic mail message sent from the terminal device 31 is received by the mail operation receiving unit 123 of the mail server 100.

[At S31] When the mail operation receiving unit 123 receives an operation, the mail providing unit 114 specifies a user who has performed the operation on the electronic mail message using the terminal device 31 by referring to the mail management information storage unit 151. Then, the mail providing unit 114 extracts mail management information about the electronic mail message, which is associated with the specified user, from the mail information storage unit 160.

[At S32] The mail providing unit 114 extracts mail information about an electronic mail message provided to the user who has performed the operation on the electronic mail message from the mail information storage unit 160 on the basis of the mail management information extracted in S31. Then, the mail providing unit 114 creates mail providing information on the basis of the extracted mail information. Then, the mail providing unit 114 outputs the created mail providing information to the terminal device 31 via the LAN 10. Therefore, an electronic mail message addressed to a user, which is held in the mail server 100, is provided to the user. In this case, the mail providing unit 114 obtains mail information about an original open mail message on the basis of the mail path included in the mail management information.

[At S33] The mail operation receiving unit 123 determines whether or not the operation received when the execution of the mail operation receiving process is started or an operation received in S35 described below is "sorting" in which electronic mail messages addressed to a user are arranged in a specified order and are displayed. When the received operation is sorting, the process proceeds to S34. When the received operation is an operation other than sorting, the process proceeds to S41 in FIG. 8B.

[At S34] The mail operation receiving unit 123 sets a sorting method input by the user together with the sorting operation performed by the user. On the basis of the set sorting method, the mail providing unit 114 outputs an electronic mail message defined in the mail providing information in S32. For example, electronic mail messages are sorted in order of character code of the subject, character code of the sender, date and time of receipt, or any other order. The sorting process will be described below with reference to FIG. 19.

[At S35] The mail operation receiving unit 123 receives the operation for the electronic mail message sent from the terminal device 31 used by the user via the LAN 10. This allows the user to continue the operation for the electronic mail message.

[At S41] The mail operation receiving unit 123 determines whether or not the operation received when the execution of the mail operation receiving process is started or the operation received in S35 is "deletion of open mail" in which the open-mail target user deletes the open mail message. When the received operation is deletion of open mail, the process proceeds to S42. When the received operation is an operation other than deletion of open mail, the process proceeds to S43.

[At S42] The mail operation receiving unit 123 executes a user deletion process illustrated in FIG. 9.

[At S43] The mail operation receiving unit 123 determines whether or not the operation received when the execution of the mail operation receiving process is started or the operation received in S35 is "making open mail non-open" in which the open-mail source user cancels the setting of the open mail message that has been made open and prohibits the open mail message from being open. When the received operation is making open mail non-open, the process proceeds to S44. When the received operation is an operation other than making open mail non-open, the process proceeds to S45.

Figure 10:
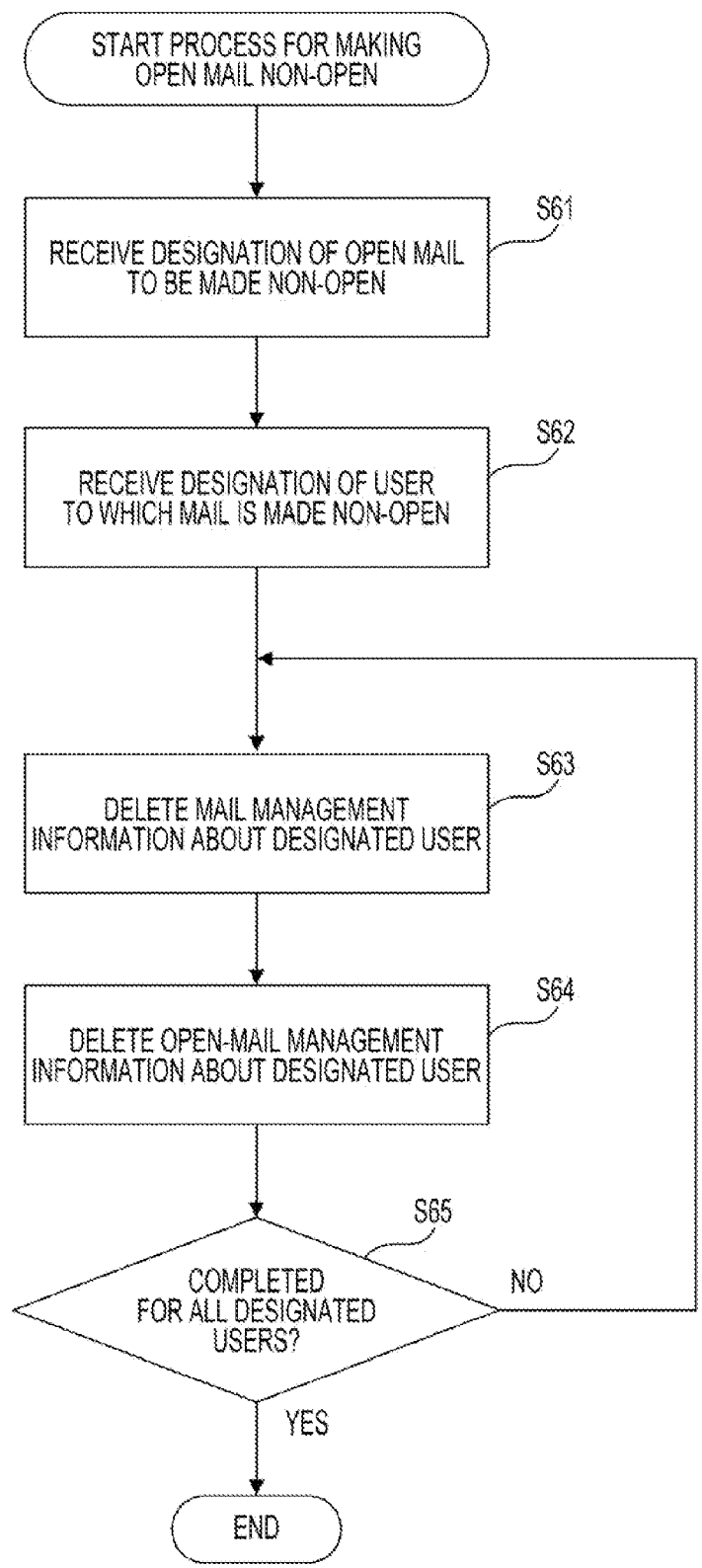
FIG. 10 is a flowchart illustrating the procedure of a process for making open mail non-open.

[At S44] The mail operation receiving unit 123 executes a process illustrated in FIG. 10 for making open mail non-open.

[At S45] The mail operation receiving unit 123 determines whether or not the operation received when the execution of the mail operation receiving process is started or the operation received in S35 is "termination" in which the display of electronic mail messages is terminated. When the received operation is termination, the process ends. When the received operation is an operation other than termination, the process proceeds to S46.

[At S46] When the received operation is not any of the above operations, the mail operation receiving unit 123 executes a process corresponding to the received operation. Examples of such operations include browsing the body of an electronic mail message, deleting an electronic mail message other than an open mail message, creating a new electronic mail message, and sending a reply via electronic mail. Then, the process proceeds to S31

FIG. 9 is a flowchart illustrating the procedure of a user deletion process. The user deletion process illustrated in FIG. 9 may be a process including receiving an operation of an open-mail target user and deleting an open mail message made open to the open-mail target user. The execution of the user deletion process is started by the mail server 100 when the mail server 100 receives a request for deleting an open mail message sent from the terminal device 31 used by an open-mail target user belonging to the organization 30 via the LAN 10.

[At S51] The mail operation receiving unit 123 receives deletion mail designation information from the terminal device 32, which indicates an electronic mail message that has been deleted by a user. The deletion mail designation information may be, for example, a message ID.

[At S52] The mail operation receiving unit 123 determiners whether or not the mail type of the electronic mail message deleted in the deletion mail designation information received in S51 is "open". When the mail type is "open", the process proceeds to S53. When the mail type is "normal", the process proceeds to S55.

[At S53] The mail operation receiving unit 123 searches the open-mail management information stored in the open-mail management information storage unit 152, and specifies open-mail management information about an open mail message to be deleted. The open-mail management information may be specified by comparing the message ID of the open mail message to be deleted in the deletion mail designation information received in S51 with an open-mail target message ID included in mail management information and extracting mail management information including an open-mail target message ID that matches the message ID of the open mail message to be deleted.

[At S54] The mail operation receiving unit 123 updates the state of the open-mail management information about the open mail message that has been deleted by the user. Specifically, the mail operation receiving unit 123 updates the "state" item included in the open-mail management information specified in step S53 to "deleted".

[At S55] The mail operation receiving unit 123 deletes the mail management information about the electronic mail message that has been deleted by the user from the mail management information storage unit 151. The mail management information to be deleted may be specified using, for example, the user ID and the message ID.

FIG. 10 is a flowchart illustrating the procedure of a process for making open mail non-open. The process for making open mail non-open illustrated in FIG. 10 may be a process including receiving an operation of an open-mail source user and canceling the setting of an open mail message that has been made open to other users so as to make the open mail message non-open. The execution of the process for making open mail non-open is started by the mail server 100 when the mail server 100 receives a request for canceling the setting of making a mail message open from the terminal device 31 or 32 used by a user belonging to the organization 30.

[At S61] The mail operation receiving unit 123 receives non-open-mail designation information indicating an open mail message designated to be made non-open by an open-mail source user from the terminal device 31. The non-open-mail designation information may be, for example, a message ID.

[At S62] The mail operation receiving unit 123 receives non-open-mail-target designation information indicating an open-mail target user to which the open mail message is not made open by the open-mail source user from the terminal device 31. The non-open-mail-target designation information may be, for example, a user ID. In this case, the open-mail source user may designate a plurality of open-mail target users in a single process.

[At S63] The mail operation receiving unit 123 deletes mail management information about an open mail message associated with the open-mail target user included in the non-open-mail-target designation information, from the mail management information storage unit 151. The mail management information to be deleted may be specified using, for example, the user ID and the message ID.

[At S64] The mail operation receiving unit 123 deletes open-mail management information about the open mail message associated with the open-mail target user included in the non-open-mail-target designation information, from the open-mail management information storage unit 152. The open-mail management information to be deleted may be specified using, for example, the open-mail target user ID and the open-mail source message ID.

[At S65] The mail setting unit 113 determines whether or not the operation of deleting the mail management information about the open mail message and updating the open-mail management information about the open mail message has been completed for open-mail target users included in the non-open-mail-target designation information. When the operation has been completed for all the designated open-mail target users, the process ends. When the operation has not been completed for all the open-mail target users, the process proceeds to S63. In this manner, when a plurality of open-mail target users are designated by the open-mail source user, the processing of S63 to S64 is repeatedly performed until the processing has been completed for all the users.

Next, the operation of a mail system according to the embodiment will be described. The operation performed before and after an open-mail source user performs a setting of making electronic mail open will now be described with reference to FIGS. 11 to 18.

FIG. 11 is a diagram illustrating a mail management table 151b obtained before an electronic mail message is made open. The mail management table 151b illustrated in FIG. 11 has the same items as those of the mail management table 151a described above with reference to FIG. 5. In the mail management table 151b, for convenience of illustration, while mail management information has been set for normal mail messages, no mail management information is set for open mail messages because no open mail messages currently exist on the mail system.

Here, a row (1) in the mail management table 151b illustrated in FIG. 11 includes mail management information about an electronic mail message to be designated as an open mail message, as described below with reference to FIG. 13.

Figure 12:
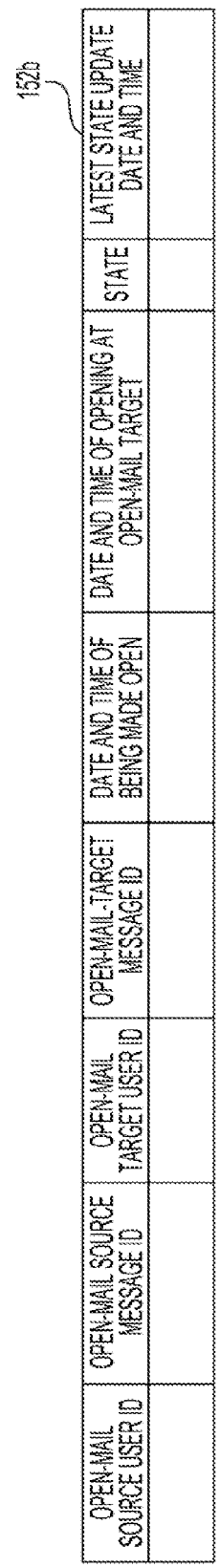
FIG. 12 is a diagram illustrating an open-mail management table obtained before an electronic mail message is made open.

FIG. 12 is a diagram illustrating an open-mail management table 152b obtained before an electronic mail message is made open. The open-mail management table 152b illustrated in FIG. 12 has the same items as those of the open-mail management table 152a described above with reference to FIG. 6. The open-mail management table 152b corresponds to the mail management table 151b described above with reference to FIG. 11. For convenience of illustration, no open mail messages exist on the mail system when the open-mail management table 152b is created, and therefore no mail management information is set for open mail messages.

Figure 13:
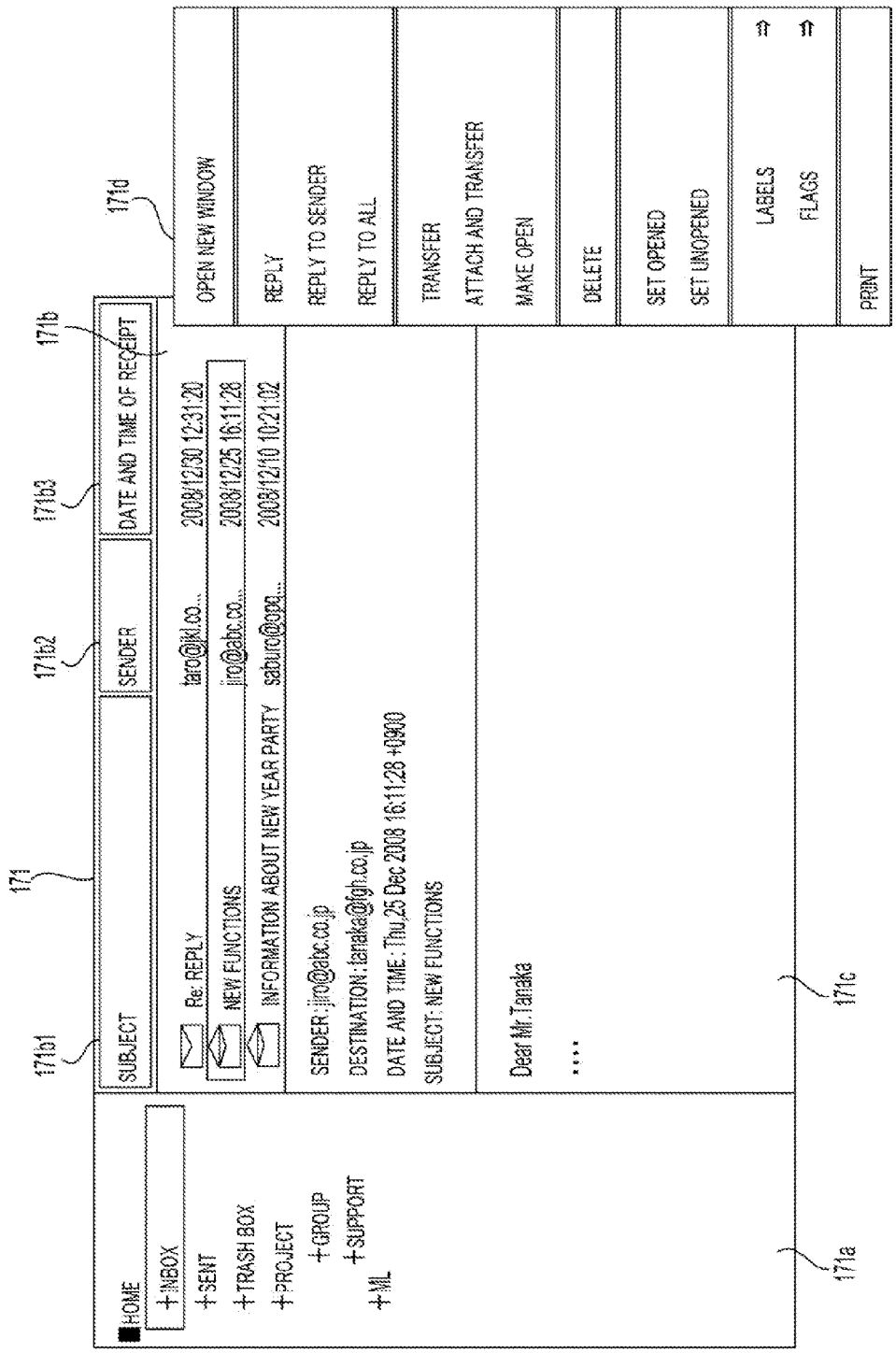
FIG. 13 is a diagram illustrating a received-mail display window obtained when an electronic mail message is made open, which is displayed to an open-mail source user.

FIG. 13 is a diagram illustrating a received-mail display window obtained when an electronic mail message is made open, which is displayed to an open-mail source user.

A received-mail display window 171 has a folder display area 171a, a list view area 171b, and a body display area 171c. The list view area 171b has sorting buttons 171b1, 171b2, and 171b3. In the folder display area 171a, the status of folders for electronic mail messages received at the account of the open-mail source user is displayed. In the list view area 171b, a list of electronic mail messages in a folder selected in the folder display area 171a is displayed. In the body display area 171c, the body of an electronic mail message selected in the list view area 171b is displayed.

In FIG. 13, a menu 171d for allowing a user to operate the selected electronic mail message is further displayed near the received-mail display window 171. The user may start the menu 171d by, for example, clicking the right button of the mouse 13 when an electronic mail message is being selected in the list view area 171b. Then, the user clicks on an item on the menu 171d with the mouse 13 when the electronic mail message is being selected, thereby executing a process on the selected electronic mail message, such as "reply", "transfer", "make open", or "delete". Accordingly, the user may designate an electronic mail message to be made open to other users.

In the folder display area 171a, folders at the account of the open-mail source user are displayed. Examples of the folders include the following folders: "inbox", "sent", "trash box", "project", "group", "support", and "ML".

In the list view area 171*b*, electronic mail messages in the folder display area 171*a* are arranged in a predetermined order and are displayed. When a user who views a list of electronic mail messages displayed in the list view area 171*b* wishes to view the body of one of the electronic mail messages, the user selects the desired electronic mail message in the list displayed in the list view area 171*b* to display the body of the selected electronic mail message in the body display area 171*c*. When an electronic mail message is selected by the user first time, the selected electronic mail message is "opened", and the mail-opened flag in the mail management information is updated in response to the opening operation.

The sorting buttons 171*b*1, 171*b*2, and 171*b*3 may be buttons for sorting electronic mail messages displayed in the list view area 171*b*. A user may operate the sorting button 171*b*1 to arrange the electronic mail messages displayed in the list view area 171*b* in order of character code of the subject. A user may operate the sorting button 171*b*2 to arrange the electronic mail messages displayed in the list view area 171*b* in order of character code of the sender. A user may operate the sorting button 171*b*3 to arrange the electronic mail messages displayed in the list view area 171*b* in order of the date and time of receipt.

A user may operate the sorting button 171*b*1, 171*b*2, or 171*b*3 a plurality of times to alternately change the order of the electronic mail messages arranged and displayed in the list view area 171*b* between ascending order and descending order.

Furthermore, a user may operate the sorting button 171*b*1, 171*b*2, or 171*b*3 to change the setting of the order in which the electronic mail messages displayed in the list view area 171*b* are arranged. For example, when a user operates the sorting button 171*b*3 in order to arrange the electronic mail messages in order of the date and time of receipt, the electronic mail messages are displayed in a manner of being arranged in order of the date and time of receipt until the setting is changed again.

When an open-mail source user who has read an electronic mail message displayed in the body display area 171*c* wishes to set the electronic mail message as an open mail message so as to make the electronic mail message open to other users, the user may operate the menu 171*d* to perform the setting. The other users are open-mail target users.

Figure 14:
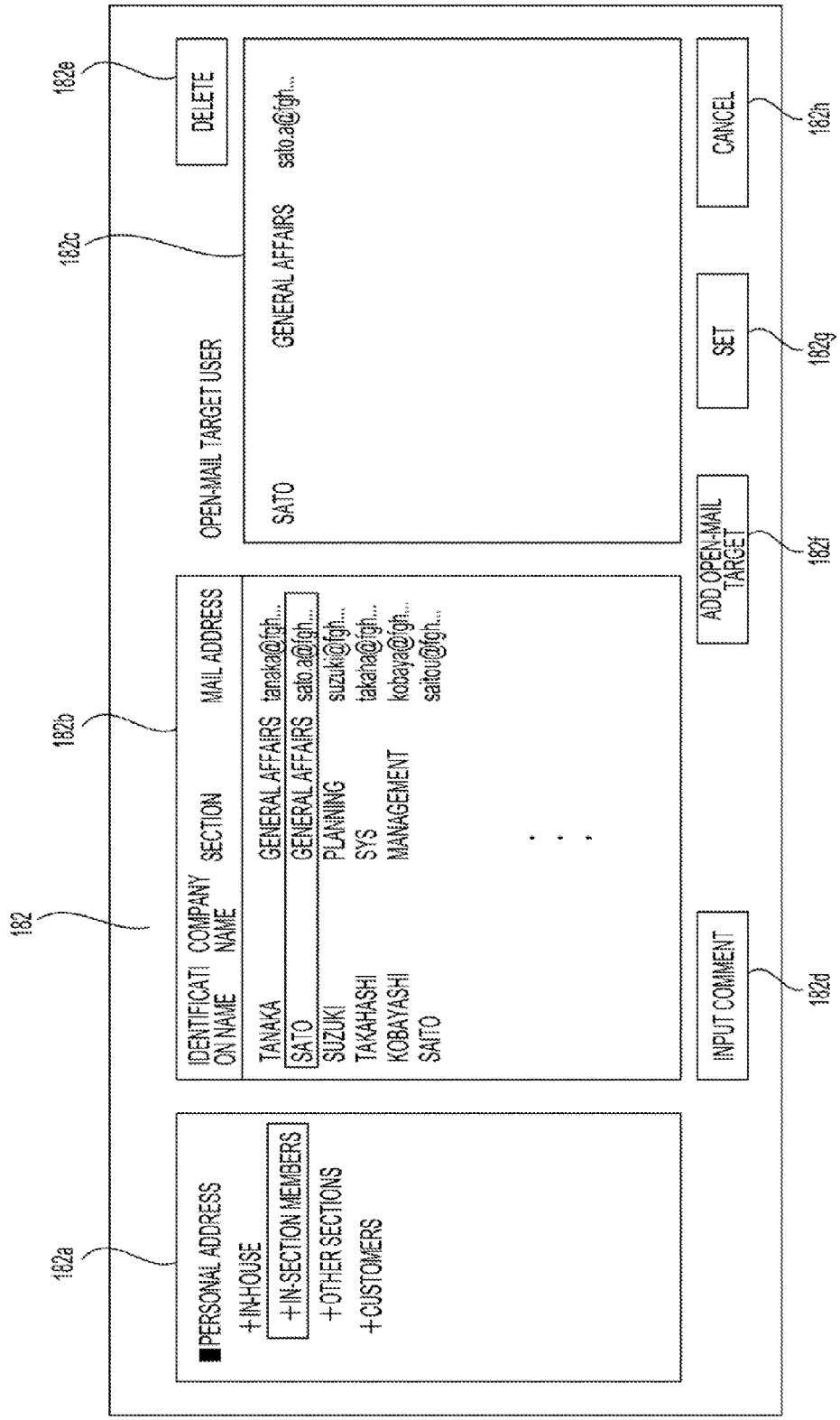
FIG. 14 is a diagram illustrating an open-mail-target-user designation window obtained when an electronic mail message is made open, which is displayed to an open-mail source user.

FIG. 14 is a diagram illustrating an open-mail-target-user designation window obtained when an electronic mail message is made open, which is displayed to an open-mail source user.

An open-mail-target-user designation window 182 includes a section display area 182*a*, a candidate user display area 182*b*, and a designated user display area 182*c*. In the section display area 182*a*, a section to which a user that may be designated as an open-mail target user belongs is displayed. In the candidate user display area 182*b*, a candidate that may be designated as an open-mail target user is displayed. In the designated user display area 182*c*, a designated open-mail target user is displayed.

The open-mail-target-user designation window 182 further has a comment input button 182*d*, a deletion button 182*e*, an open-mail-target addition button 182*f*, a setting button 182*g*, and a cancel button 182*h*. The comment input button 182*d* is used to receive the operation of starting a comment input window 193 for allowing a user to input a comment to an open mail message. The deletion button 182*e* is used to receive the operation of deleting a designated open-mail target user to cancel the designation. The open-mail-target addition button 182*f* is used to receive the operation of designating a user selected in the candidate user display area 182*b*. The setting button 182*g* is used to receive the operation of advancing the process of making mail open to a user displayed in the designated user display area 182*c* as a designated user. The cancel button 182*h* is used to receive the operation of canceling the process of making mail open.

When the open-mail source user designates an open-mail target user, first, the open-mail source user selects a section to which a user to be designated as an open-mail target user belongs in the section display area 182*a*. Therefore, a user belonging to the section selected in the section display area 182*a* is displayed as a candidate open-mail target user in the candidate user display area 182*b*.

Then, the open-mail source user designates a user displayed in the candidate user display area 182*b*, and operates the open-mail-target addition button 182*f*, thereby displaying the designated user as an open-mail target user in the designated user display area 182*c*. The open-mail source user may repeatedly perform this operation a plurality of times to designate a plurality of open-mail target users in a single process. The open-mail source user may also select an open-mail target user for which designation is canceled in the designated user display area 182*c* and operate the deletion button 182*e*, thereby canceling the designation of the designated open-mail target user.

Then, the open-mail source user may operate the setting button 182*g* to set the designation of the open-mail target user. The open-mail source user may also operate the cancel button 182*h* to stop the process of making mail open.

Figure 15:
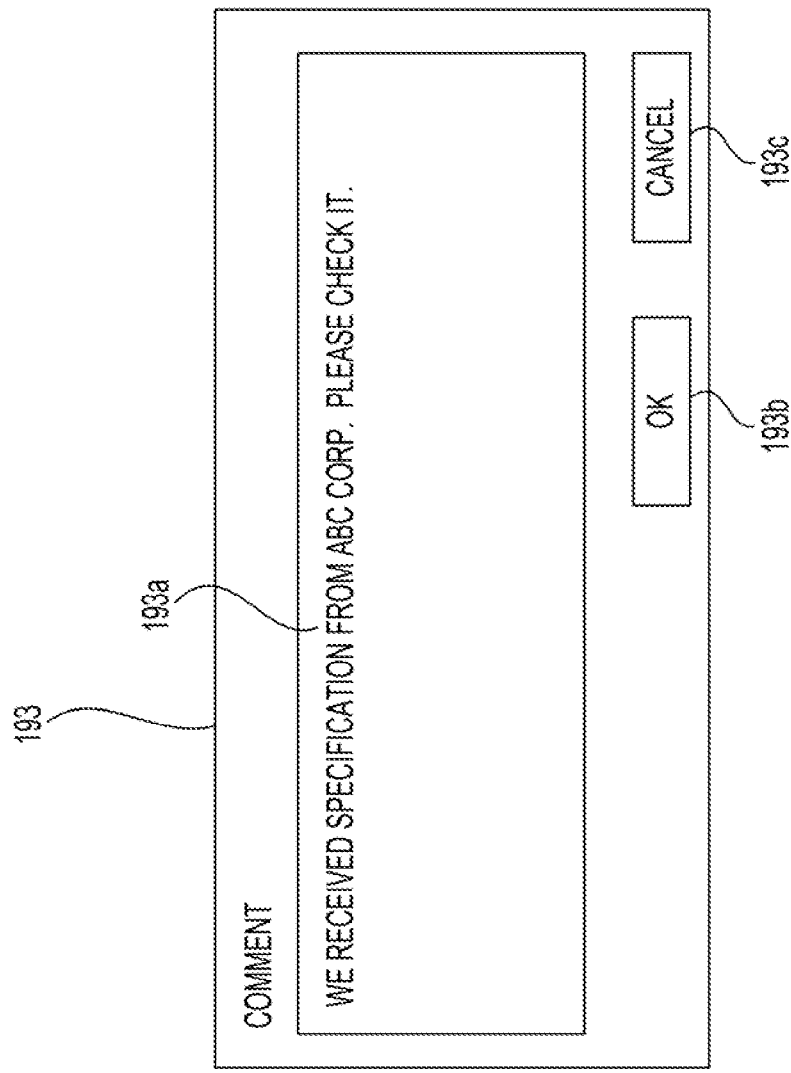
FIG. 15 is a diagram illustrating an example of a comment input window obtained when a comment to an electronic mail message that is made open is input, which is displayed to an open-mail source user.

FIG. 15 is a diagram illustrating an example of a comment input window obtained when a comment to an electronic mail message that is made open, which is displayed to an open-mail source user.

A comment input window 193 has a comment input area 193*a*, an OK button 193*b*, and a cancel button 193*c*. A comment to an open mail message is input in the comment input area 193*a*. When a comment is input, the OK button 193*b* receives the operation of setting the content of the comment and saving the content of the comment and returning the open-mail-target-user designation window 182. The cancel button 193*c* receives the operation of canceling the input comment.

Therefore, the open-mail source user may input a comment to an open mail message and may let an open-mail target user view the comment together with the open mail message.

FIG. 16 is a diagram illustrating an example of a mail management table 151*c* obtained after an electronic mail message is made open. The mail management table 151*c* illustrated in FIG. 16 has the same items as those of the mail management table 151*a* and the like.

As illustrated in FIG. 16, the open-mail source user performs the operation of making an electronic mail message open, which is illustrated in FIGS. 13 to 15, thereby setting mail management information about an open mail message addressed to an open-mail target user in a manner indicated in a row (2) illustrated in FIG. 16 on the basis of mail management information indicated in rows (1) in the mail management tables 151*b* and 151*c* illustrated in FIGS. 11 and 16. Open-mail management information is also set for the open mail message addressed to the open-mail target user, as described in detail below with reference to FIG. 17.

In connection to this, as indicated in a row (3) illustrated in FIG. 16, the mail management information about the open mail message is also set for confirmation of the open-mail source user. The mail management information about the open mail message addressed to the open-mail source user may be set in such a manner that, as indicated in the item "folder" in the row (3) illustrated in FIG. 16, the open mail message is sorted into a "mail currently open" folder.

As indicated in the rows (2) and (3) illustrated in FIG. 16, the items "date and time of sending/receipt" in the mail management information about the open mail message addressed to the open-mail target user and the mail management information about the open mail message addressed to the open-mail source user may be set to the date and time at which the open-mail source user starts the operation of making mail open. In addition, the items "message ID" in the pieces of mail management information about the above open mail messages may be individually set and may also be set to be different from the message ID of the original electronic mail message that the open mail messages are based on.

The items "mail path" in the above pieces of mail management information about the above open mail messages and the original electronic mail message are set to the same value. That is, the same data is shared between pieces of mail information indicating the content, header information, and the like of an original electronic mail message and open mail messages based on the original electronic mail message.

FIG. 17 is a diagram illustrating an example of an open-mail management table 152c obtained after an electronic mail message is made open. The open-mail management table 152c illustrated in FIG. 17 has the same items as those of the open-mail management table 152a described above with reference to FIG. 6. The open-mail management table 152c corresponds to the mail management table 151c described above with reference to FIG. 16.

As illustrated in FIG. 17, the open-mail source user performs the operation of making an electronic mail message open, which is illustrated in FIGS. 13 to 15, thereby setting open-mail management information about an open mail message addressed to an open-mail target user in a manner indicated in a row (4) illustrated in FIG. 17. The open-mail management information about the open mail message addressed to the open-mail target user is set in association with the mail management information included in the row (2) illustrated in FIG. 16.

As indicated in a row (4) illustrated in FIG. 17, furthermore, the item "open-mail source user ID" in the open-mail management information about the open mail message may be set to the information obtained from the item "user ID" in the mail management information about the original electronic mail message that the open mail message is based on (see the row (3) illustrated in FIG. 16).

Likewise, the item "open-mail source message ID" in the open-mail management information may be set to the information obtained from the item "message ID" in the mail management information about the original electronic mail message. The item "open-mail target user ID" may be set to the information obtained from the item "user ID" in the mail management information about the corresponding one of the open mail messages. The item "open-mail target message ID" in the open-mail management information may be set to the information obtained from the item "message ID" in the mail management information about the corresponding one of the open mail messages. The item "date and time of being made open" in the open-mail management information may be set to the date and time at which the open-mail source user starts the operation of making mail open.

In the embodiment, no open-mail management information is set for the open-mail source user. However, open-mail management information about the open mail message addressed to the open-mail source user may also be set.

Figure 18:
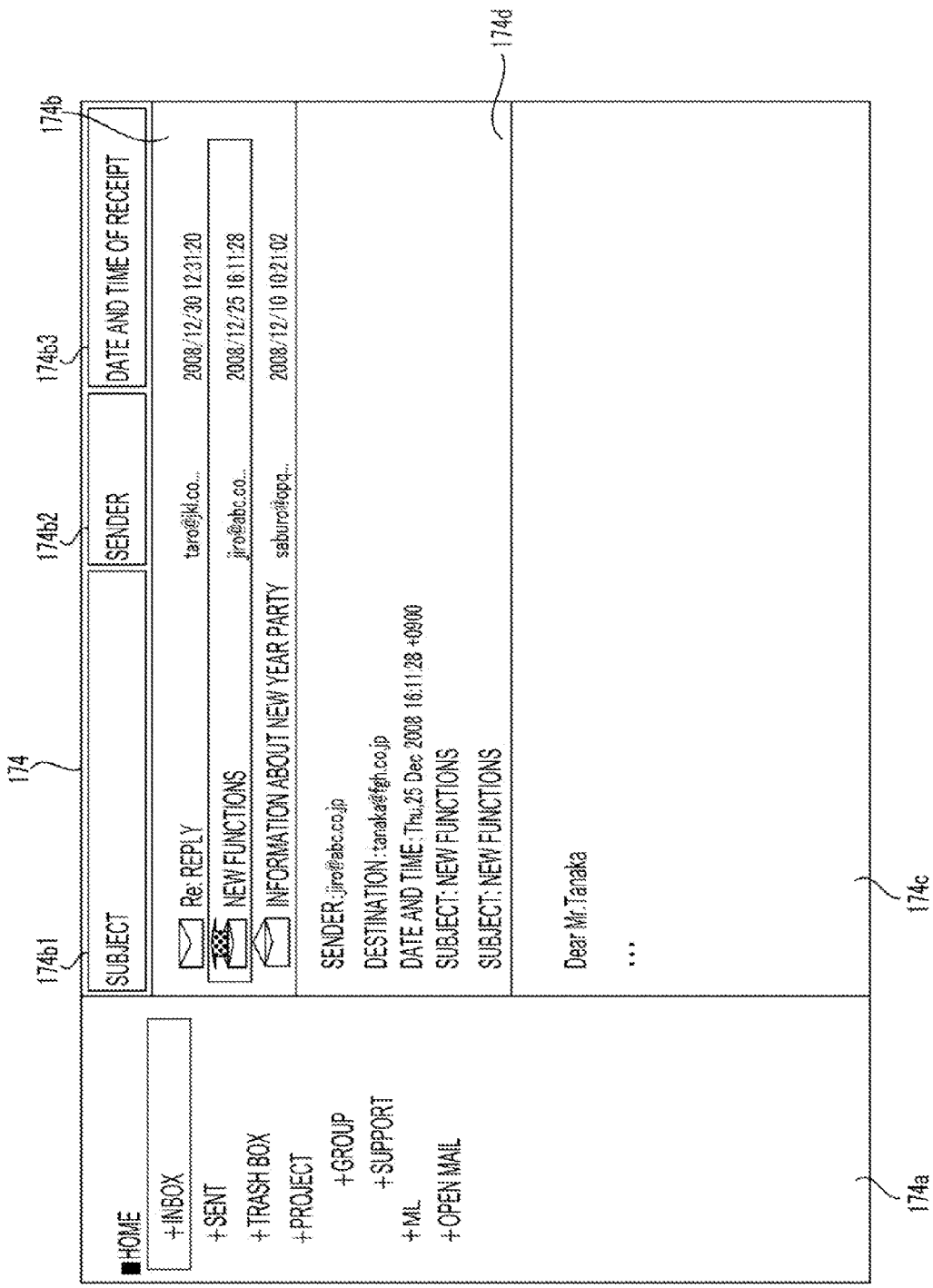
FIG. 18 is a diagram illustrating an example of a received-mail display window obtained after an electronic mail message has been made open, which is displayed to an open-mail source user.

FIG. 18 is a diagram illustrating an example of a received-mail display window obtained after an electronic mail message has been made open, which is displayed to an open-mail source user.

As in the received-mail display window 171 illustrated in FIG. 13, a received-mail display window 174 has a folder display area 174a, a list view area 174b, and a body display area 174c. The list view area 174b has sorting buttons 174b1, 174b2, and 174b3. The received-mail display window 174 also has a comment display section 174d in which a comment to an open mail message, which is input by the open-mail source user, is displayed.

In the folder display area 174a, a "mail currently open" folder indicating the presence of an open mail message is further displayed in accordance with the operation of making an electronic mail message open by the open-mail source user. The mail-currently-open folder allows the open-mail source user to recognize the presence of an open mail message configured by the open-mail source user himself/herself. The mail-currently-open folder will be described in detail below with reference to FIG. 22.

In the list view area 174b, an original electronic mail message that an open mail message is based on and other electronic mail messages are arranged in a specified order and are displayed. As indicated in the list view area 174b illustrated in FIG. 18, an icon indicating the original electronic mail message is changed to that different from an icon indicating a normal electronic mail message so as to allow a user to understand that the original electronic mail message is an open mail message. Thus, the user may determine the existence of an open mail message based on the original electronic mail message. The mail server 100 may perform the determination by determining whether or not there is an open mail message having substantially the same mail path as that in the item "mail path" stored in the mail management table about the original electronic mail.

When the open-mail source user selects the inbox in the folder display area 174a, an open mail message and other electronic mail messages are displayed in the list view area 174 in terms of, as the date and time of receipt, the date and time of receipt of each message by the mail server 100.

In the body display area 174c, the body of the open mail message that is made open to an open-mail target user by the open-mail source user is displayed. This allows the open-mail source user to check the content of the open mail message.

In the comment display section 174d, a comment to the open mail message, which is input by the open-mail source user through the comment input window 193 described above with reference to FIG. 15, is displayed. The open-mail source user may check the comment to the open mail message included in the mail management information through the comment display section 174d in the received-mail display window 174.

FIG. 19 is a diagram illustrating an example of a received-mail display window obtained when an electronic mail message is made open, which is displayed to an open-mail target user.

As in the received-mail display window 174 described above with reference to FIG. 18, a received-mail display window 275 has a folder display area 275a, a list view area 275b, a body display area 275c, and a comment display section 275d. The list view area 275b has sorting buttons 275b1, 275b2, and 275b3. An open-mail indicator 275e indicating an open mail message is further displayed in the received-mail display window 275.

An open mail message that is made open to an open-mail target user through the operation of making mail open as illustrated in FIG. 13 is displayed together with other electronic mail messages in the list view area 275b. As indicated in the list view area 275b illustrated in FIG. 19, an icon indicating an open mail message is changed to that different from an icon indicating a normal electronic mail message so that a user can recognize the presence of the open mail message.

When a user wishes to view the body of an open mail message from the list displayed in the list view area 275b, the user selects an open mail message in the list view area 275b. Thus, the body of the selected open mail message is displayed in the body display area 275c. Then, the open-mail indicator 275e is displayed. When an open mail message is selected by the user first time, the selected open mail message is "opened". In addition, the mail-opened flag of the open mail message in the mail management table is updated in response to the opening operation.

The date and time of receipt of an open mail message among mail messages displayed in a list in the list view area 275b are set to the date and time at which the open-mail source user performs the operation of making the corresponding electronic mail message open. For a mail message that is not an open mail message sent to an open-mail target user as the destination, the date and time at which the mail server 100 receives this mail message are set as the date and time of receipt. Therefore, for example, when an open mail message based on an electronic mail message previously received by the open-mail source user is made open, the open mail message is sorted by the date and time of receipt and is displayed in the list view area 275b because the date and time at which the mail message is set to be made open by the open-mail source user are set as the date and time of receipt.

For example, as illustrated in FIG. 19, the open mail message is displayed at the top of the list view area 275b by sorting. This may prevent the open mail message from being mixed up with other electronic mail message and allows a user to be easily aware of the open mail message. This facilitates knowledge of information to be shared.

A mail message having a subject "New Functions", which is displayed as an open mail message in the list view area 174b illustrated in FIG. 18 which serves as a screen displayed to the open-mail source user by the mail server 100, has date and time of receipt "2008/12/25 16:11:28". This unit that the mail message was received at 16:11:28 on Dec. 25, 2008. This mail message corresponds to a record in the row (1) illustrated in FIG. 16.

On the other hand, a mail message having a subject "New Functions", which is displayed as an open mail message in the list view area 275b illustrated in FIG. 19 which serves as a screen displayed to the open-mail target user by the mail server 100, has date and time of receipt "2009/01/05 09:01:18". This unit that the mail message was received at 09:01:18 on Jan. 5, 2009. This mail message corresponds to a record in the row (3) illustrated in FIG. 16. Since the record in the row (3) has substantially the same mail path as the record in the row (1), they are records corresponding to substantially the same mail data.

In the embodiment, therefore, open mail messages even having substantially the same mail data are output so as to present different dates and times of receipt between the case where a list of mail messages is displayed in the inbox folder of the open-mail source user and the case where a list of mail messages is displayed in the inbox folder of the open-mail target user.

The sorting buttons 275b1, 275b2, and 275b3 are similar to the sorting buttons 171b1, 171b2, and 171b3 described above with reference to FIG. 13, respectively.

The open-mail indicator 275e indicates an open mail message and an open-mail source user. The open-mail indicator 275e allows an open-mail target user who views the open mail message to recognize that the corresponding electronic mail message is an open mail message and also to recognize the open-mail source user of the open mail message.

In the body display area 275c, the body of the open mail message that is made open to the open-mail target user by the open-mail source user is displayed. This allows the open-mail target user to view the content of the open mail message to share information included in the open mail message.

In the comment display section 275d, a comment to the open mail message, which is input by the open-mail source user through the comment input window 193 described above with reference to FIG. 15, is displayed. The open-mail target user may read the comment to the open mail message included in the mail management information through the comment display section 275d in the received-mail display window 275. This allows the open-mail target user to know information regarding the open mail message, such as the intention to make the open mail message open and supplemental information.

Next, an operation involved when an open-mail target user opens an open mail message will be described with reference to FIGS. 20 and 21.

FIG. 20 is a diagram illustrating an example of a mail management table 151d obtained after an open-mail target user has opened a mail message. The mail management table 151d illustrated in FIG. 20 has the same items as the mail management table 151a described above with reference to FIG. 5 and the like.

As illustrated in FIG. 20, an open-mail source user performs an opening operation to allow an open-mail target user to view the content of an open mail message in the received-mail display window 275 illustrated in FIG. 19. Then, with respect to the item "mail-opened flag" in the mail management information included in the row (2) in the mail management table 151c illustrated in FIG. 16, the mail management information about the open mail message is set to "opened", as indicated in the item "mail-opened flag" represented by (5) in FIG. 20. The open mail message addressed to the open-mail source user, which is based on the same electronic mail message as this open mail message, is also set to "opened".

FIG. 21 is a diagram illustrating an example of an open-mail management table 152d obtained after an open-mail target user has opened a mail message. The open-mail management table 152d illustrated in FIG. 21 has the same items as those of the open-mail management table 152a described above with reference to FIG. 6. The open-mail management table 152d corresponds to the mail management table 151d described above with reference to FIG. 20.

As illustrated in FIG. 21, the open-mail target user performs the opening operation through the received-mail display window 275, thereby setting, as the item "date and time of opening at open-mail target" in the open-mail management information about the open mail message in the row (4) illustrated in FIG. 17, the date and time at which the open-mail target user performs the opening operation to open the open mail message.

Here, as represented by the records (2) and (3) in FIG. 16, the items "date and time of sending/receipt" in the mail management information about the open mail message addressed to the open-mail target user and the mail management information about the open mail message addressed to the open-mail source user may be set to the date and time at which the open-mail source user starts the operation of making mail open. In addition, the items "message ID" in the pieces of mail management information about the above open mail messages may be individually set and may also be set to be different from the message ID of the original electronic mail message that the open mail messages are based on.

Furthermore, since the items "mail path" in the pieces of mail management information about the above open mail messages and the original electronic mail message are set to the same value. Thus, the same data may be shared between mail information indicating about the content, header information, and the like of the open mail messages and mail information indicating about the content, header information, and the like of the original electronic mail message.

Next, an operation involved when an open-mail source user checks the state ("already read") will be described with reference to FIGS. 22 and 23.

Figure 22:
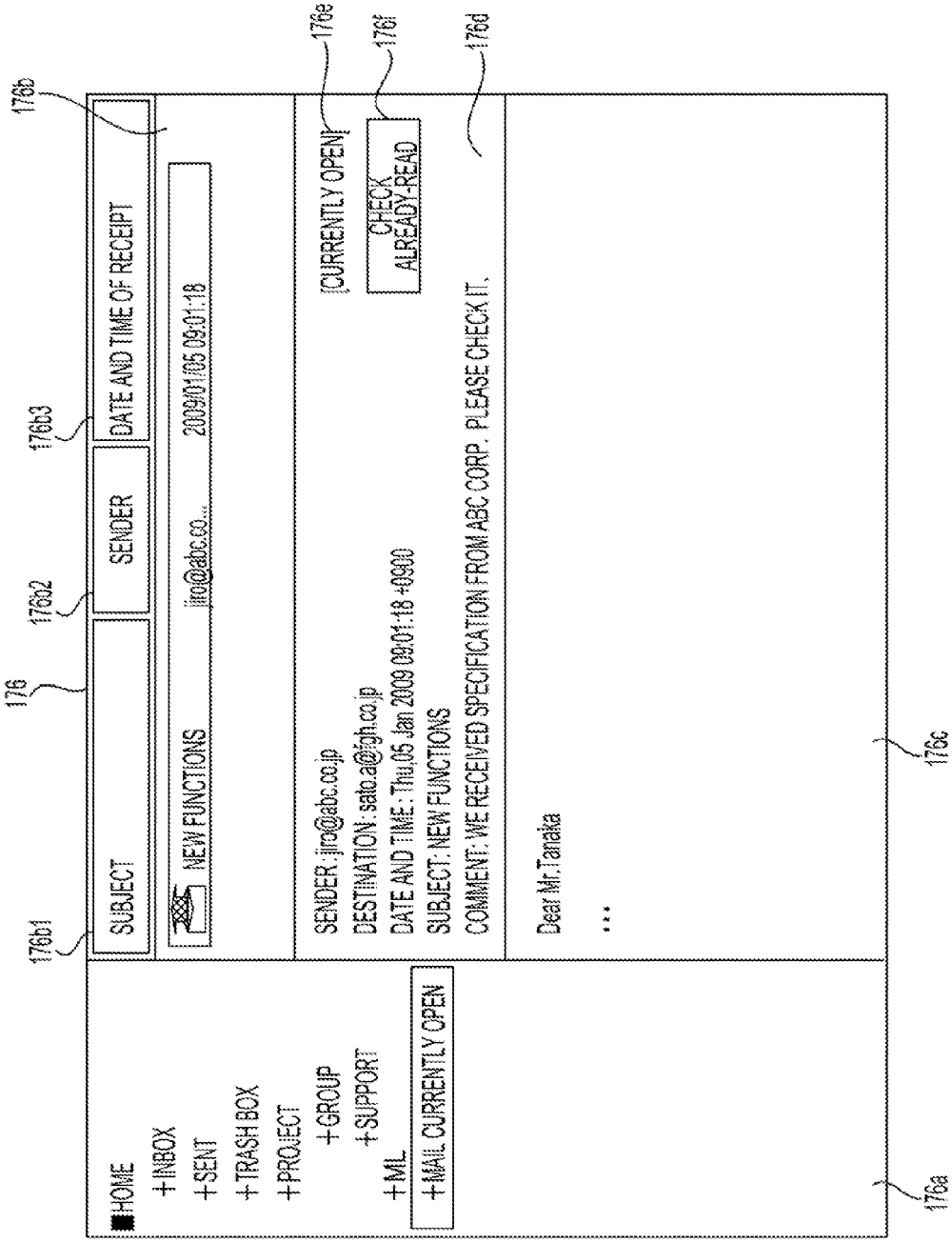
FIG. 22 is a diagram illustrating an example of a received-mail display window for checking the already-read state, which is displayed to an open-mail source user.

FIG. 22 is a diagram illustrating an example of a received-mail display window for checking the already-read state, which is displayed to an open-mail source user.

As in the received-mail display window 174 described above with reference to FIG. 18, a received-mail display window 176 has a folder display area 176a, a list view area 176b, a body display area 176c, and a comment display section 176d. The list view area 176b has sorting buttons 176b1, 176b2, and 176b3. As in the received-mail display window 275 described above with reference to FIG. 19, an open-mail indicator 176e is further displayed in the received-mail display window 176. An already-read check button 176f used to receive the operation of displaying an already-read check window 197 for allowing a user to check whether or not an open mail message has already been read (opened) by an open-mail target user is further displayed in the received-mail display window 176.

In the folder display area 176a, a "mail currently open" folder indicating the presence of an open mail message is displayed in accordance with the operation of making an electronic mail message open by the open-mail source user. The mail-currently-open folder allows the open-mail source user to recognize that the presence of an open mail message configured by the open-mail source user himself/herself. With the operation of the mail-currently-open folder, a list of open mail messages that are made open by the open-mail source user may be displayed in the list view area 176b.

An original electronic mail message that an open mail message stored in the mail-currently-open folder is based on is also stored in the inbox. Specifically, when the inbox folder is designated by the open-mail source user, the mail server 100 refers to the record (row) (1) illustrated in FIG. 16 for display. When the mail-currently-open folder is designated by the open-mail source user, the mail server 100 refers to the record (3) illustrated in FIG. 16 for display.

Further, in the list view area 174b where the inbox folder is designated by the open-mail source user, the date and time of receipt included in the record (1) illustrated in FIG. 16, that is, the date and time at which the mail message is received by the mail server 100, are displayed as the date and time of receipt. In the list view area 176b where the mail-currently-open folder is designated, the date and time of receipt included in the record (3) illustrated in FIG. 16, that is, the date and time at which the mail message is set as an open mail message by the open-mail source user, are displayed as the date and time of receipt.

When the open-mail source user wishes to view the body of an open mail message, the open-mail source user selects an open mail message displayed in the list in the list view area 176b. Thus, the body of the selected open mail message is displayed in the body display area 176c, and the open-mail indicator 176e and the already-read check button 176f are further displayed.

The open-mail indicator 176e indicates an open mail message. The open-mail indicator 176e allows an open-mail source user who has checked an open mail message to confirm again that the corresponding electronic mail message is an open mail. The open-mail source user may further operate the already-read check button 176f to display the already-read check window 197, thereby checking whether or not the open mail message has been opened by an open-mail target user.

In the body display area 176c, as in the body display area 174c of the received-mail display window 174, the body of an open mail message that is made open to an open-mail target user by the open-mail source user is displayed. A comment to the open mail message, which is input by the open-mail source user, is displayed in the comment display section 176d.

FIG. 23 is a diagram illustrating an example of an already-read check window obtained when an electronic mail message is made open, which is displayed to an open-mail source user.

An already-read check window 197 has an already-read check display area 197a in which whether or not an open mail message made open by the open-mail source user has been opened by an open-mail target user is displayed, and a close button 197b used to receive the operation of terminating the display of the already-read check window 197.

In the already-read check display area 197a, whether or not an open mail message has been opened by an open-mail target user is displayed on the basis of the open-mail management information about the open mail message. In the already-read check display area 197a, the following items are displayed: "date and time of being made open", "date and time of opening", "latest state update date and time", "user name", and "state". The date and time of being made open indicates the date and time at which the open-mail source user makes the open mail message open. The date and time of opening indicates the date and time at which an open-mail target user opens the open mail message. The latest state update date and time indicates the date and time at which the state of the open mail message is last updated. The user name indicates the name of a user who has opened the open mail message. The state indicates the current state of the open mail message are displayed. A date and time are displayed in the latest state update date and time, after the open mail message has been made open by the open-mail source user, once the state is changed such as when the open mail message is deleted by an open-mail target user. When the state is not changed after the open mail message has been made open, the latest state update date and time are displayed blank.

The open-mail source user operates the close button 197b, thereby terminating the display of the already-read check window 197.

Next, an operation involved when an open-mail target user deletes an open mail message, and an operation involved when an open-mail source user checks the state after the open-mail target user has deleted the open mail message will be described with reference to FIGS. 24 to 26.

FIG. 24 is a diagram illustrating an example of a mail management table 151e obtained after a mail message has been deleted by an open-mail target user. The mail management table 151e illustrated in FIG. 24 has the same items as those of the mail management table 151a described above with reference to FIG. 5 and the like.

For example, an open-mail target user performs an operation of deleting an open mail message using the terminal device 31 or 32 operated by the open-mail target user. In this case, mail management information included in a row (7) in the mail management table 151e illustrated in FIG. 24 is deleted.

FIG. 25 is a diagram illustrating an example of an open-mail management table 152e obtained after an open-mail target user has deleted a mail message. The open-mail management table 152e illustrated in FIG. 25 has the same items as those of the open-mail management table 152a described above with reference to FIG. 6.

As illustrated in FIG. 25, when an open-mail target user performs an operation of deleting an open mail message, "deleted" is set in the item "state" in the open-mail management table 152e, which is represented by (8) in FIG. 25. Then, the date and time at which the open-mail target user performs an operation of deleting the open mail message are set in the item "latest state update date and time".

FIG. 26 is a diagram illustrating an example of an already-read check window obtained after a mail message has been deleted by an open-mail target user, which is displayed to an open-mail source user.

As in the already-read check window 197, the already-read check window 198 has an already-read check display area 198a and a close button 198b.

In the already-read check display area 198a, the opening state of an open mail message is displayed on the basis of open-mail management information (FIG. 25) about the open mail message that reflects the deletion of the open mail message by an open-mail target user. Specifically, the date and time at which the open-mail target user performs the operation of deleting the open mail message are displayed in the item "latest state update date and time" in the already-read check display area 198a on the basis of the open-mail management information. Likewise, "deleted" is displayed in the item "state".

Next, an operation involved when an open-mail source user makes an open mail message non-open will be described with reference to FIGS. 27 to 29.

Figure 27:
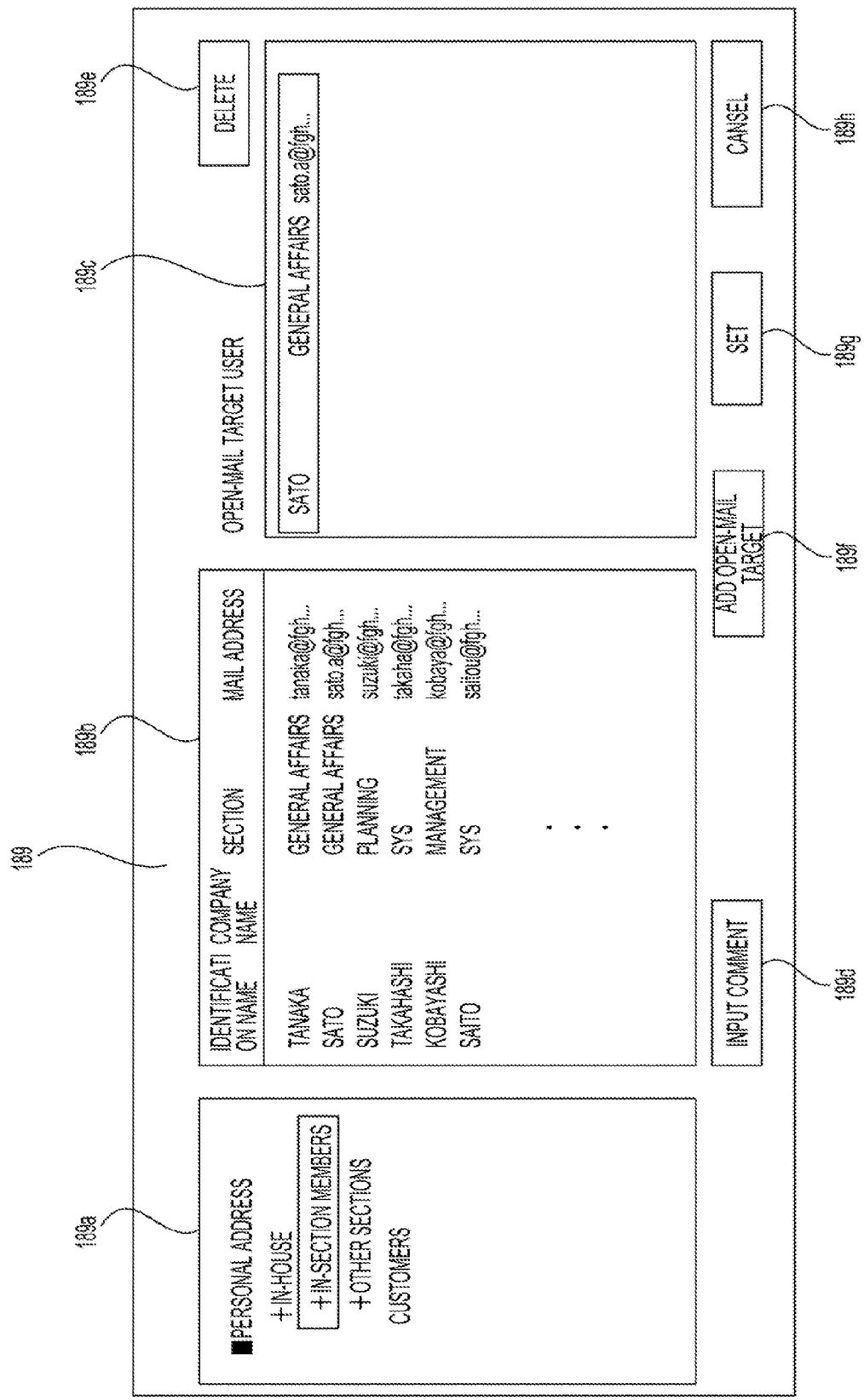
FIG. 27 is a diagram illustrating an example of an open-mail-target-user designation window obtained when an operation of making mail non-open is performed, which is displayed to an open-mail source user.

FIG. 27 is a diagram illustrating an example of an open-mail-target-user designation window obtained when an operation of making mail non-open, which is displayed to an open-mail source user.

As in the open-mail-target-user designation window 182 described above with reference to FIG. 14, an open-mail-target-user designation window 189 has a section display area 189a, a candidate user display area 189b, a designated user display area 189c, a comment input button 189d, a deletion button 189e, an open-mail-target addition button 189f, a setting button 189g, and a cancel button 189h.

An open-mail source user who wishes to make an open mail message non-open displays, for example, the received-mail display window 176 described above with reference to FIG. 22. Then, the open-mail source user displays an open-mail-target-user designation window 189 by performing an operation such as selecting an open mail message displayed in the list view area 176b. Then, the open-mail source user designates an open-mail target user to which the open mail message is not made open through the open-mail-target-user designation window 189. Then, the open-mail source user designates the open-mail target user to which the open mail message is not made open in the designated user display area 189c of the open-mail-target-user designation window 189, and operates the deletion button 189e. Therefore, the designated open-mail target user displayed in the designated user display area 189c is deleted, and the open mail message addressed to the deleted open-mail target user is made non-open. The open-mail source user may repeatedly perform this operation a plurality of times to designate and delete a plurality of open-mail target users in a single process. The open-mail source user may also operate the cancel button 189h to cancel the setting of the open mail message that has been made non-open to the deleted open-mail target user.

FIG. 28 is a diagram illustrating an example of a mail management table 151f obtained after a mail message has been made non-open by an open-mail source user. The mail management table 151f illustrated in FIG. 28 has the same items as those of the mail management table 151a described above with reference to FIG. 5 and the like.

For example, an open-mail source user performs an operation of making an open mail message non-open to an open-mail target user using the terminal device 31. In this case, mail management information about the open mail message that has been made non-open is deleted from the mail management information storage unit 151.

Specifically, mail management information about an open mail message that has been made non-open to an open-mail target user, which is included in a row (10) in the mail management table 151f illustrated in FIG. 28, is deleted. Further, when the open mail message is made non-open to all open-mail target users, as indicated in a row (9) in the mail management table 151f illustrated in FIG. 28, not only the mail management information about the open mail message for the open-mail target user but also the mail management information about the open mail message for the open-mail source user may be deleted.

FIG. 29 is a diagram illustrating an example of an open-mail management table 152f obtained after a mail message has been made non-open by an open-mail source user. The open-mail management table 152f illustrated in FIG. 29 has the same items as those of the open-mail management table 152a described above with reference to FIG. 6.

For example, an open-mail source user performs an operation of making an open mail message non-open to an open-mail target user using the terminal device 31. In this case, open-mail management information about the open mail message that has been made non-open is deleted from the open-mail management information storage unit 152. Specifically, open-mail management information about an open mail message that has been made non-open to an open-mail target user, which is included in a row (11) in the open-mail management table 152f illustrated in FIG. 29, is deleted.

Accordingly, the mail server 100 of the embodiment resets the date and time of receipt of an open mail message as date and time information about the open mail message, thereby avoiding a new open mail message from being mixed up with old mail messages when sorted by the date and time of receipt. This may avoid a risk that a destination user will be unaware of the new open mail message.

Furthermore, the mail server 100 of the embodiment does not involve transfer of mail to be shared, which may prevent an increase in communication traffic caused by the transfer. Furthermore, the mail server 100 of the embodiment does not involve copying mail information indicating the content of a mail message, which is stored for an open mail message that is made open to an open-mail target user. Therefore, the mail server 100 may also prevent an increase in the storage capacity of a storage device. According to the embodiment, therefore, the mail server 100 makes a mail message personally sent to a given user open to a plurality of users to share the content of the mail message while reducing the increase in system load.

Furthermore, the mail server 100 of the embodiment may specify an address with which information is shared in accordance with the content to be made open, and may properly mange the information.

In addition, since an open-mail source user may check whether an open mail message has been opened by an open-mail target user, the content to be shared, which is made open, may be easily disseminated through open mail.

Furthermore, an open-mail source user may make open mail, which has been made open, non-open. Thus, a mail message that has been made open by an incorrect operation or the like, which is undesirable, may be made non-open. This may avoid extra transmission of information or unnecessary confusion caused thereby inside a group.

Furthermore, an open mail message is displayed in a mail display window using a predetermined icon different from that for a normal electronic mail message. Thus, an open-mail target user may visually perceive the presence of an open mail message whose content is to be shared. This may avoid insufficient transmission caused when information included in an important or desired electronic mail message, to be shared, is mixed up with other mail messages and may prevent an open-mail target user from being unaware of the information.

The process functions described above may be implemented by a computer. In this case, a program describing processes of the functions to be achieved by the mail server 100 is provided. A computer executes the program so that the process functions described above may be implemented on the computer.

A program describing the processes may be recorded on a computer-readable storage medium. Examples of the computer-readable storage medium may include a magnetic storage device, an optical disk, a magneto-optical storage medium, and a semiconductor memory. Examples of the magnetic storage device include an HDD, a flexible disk (FD), and a magnetic tape (MT). Examples of the optical disk include a digital versatile disk (DVD), a DVD-RAM, a read only memory (CD-ROM), and CD-recordable/rewritable (CD-R/RW). Examples of the magneto-optical storage medium include a magneto-optical (MO) disk.

The program may be distributed by, for example, putting portable storage media having the program recorded thereon, such as DVDs and CD-ROMs, into market. The program may also be stored in a server computer and transferred from the server computer to other computers over networks.

A computer that executes the program stores, for example, a program recorded on a portable storage medium or a program transferred from a server computer onto a storage device of the computer. Then, the computer reads the program from the storage device thereof, and executes a process according to the program. The computer may also read the program directly from a portable storage medium and execute a process according to the program. Alternatively, each time a program is transferred from a server computer, the computer may sequentially execute a process according to the received program.

While a mail management program, a mail management apparatus, and a mail management method, as disclosed herein, have been described with respect to illustrated embodiments, the configuration of the individual devices may be replaced by any desired configuration having functions similar thereto. Furthermore, any desired composition or operation may be added to the technique disclosed herein. The technique disclosed herein may be a combination of two or more desired configurations in the embodiments described above.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

The invention claimed is:

1. A non-transitory storage medium storing a mail management program, the mail management program causing a computer to execute an operation comprising:

receiving from a first user, a designation of a first electronic mail addressed to the first user as an open mail, the first electronic mail is made open to a second user;

first setting a receiving time at which the designation is received as first time information corresponding to the open mail;

second setting another receiving time at which a second electronic mail being received by the computer as second time information corresponding to the second electronic mail, the second electronic mail is not the open mail and also being addressed to the second user;

upon receipt of an output instruction from the second user, outputting the open mail and the second electronic mail in accordance with the first and second time information, respectively, when the designation is received, adding a record into a mail management table, the record including user identification of the second user, the first time information, and a mail pass to a first mail information that includes a content of the first electronic mail; and wherein the mail management table stores the record and another record that includes another user identification of the first user, third time information corresponding to a receipt of the first electronic mail by the first user, and the mail pass.

2. The non-transitory storage medium according to claim 1, wherein the first electronic mail is addressed and sent to the first user via webmail.

3. The non-transitory storage medium according to claim 1, wherein outputting the open mail and the second electronic mail comprises:

referring to a mail information storage unit for storing first mail information indicating content of the open mail and second mail information indicating content of the second electronic mail;

obtaining the first mail information and the second mail information from the mail information storage unit; and outputting the obtained first mail information and the obtained second mail information.

4. The non-transitory storage medium according to claim 1, wherein the mail management program causes the computer to execute the operation that further comprises:

receiving an opening operation performed on the open mail by the second user;

setting opening information to indicate an opening state of the open mail as a result of the opening operation performed by the second user; and providing the opening information upon receipt of a state request from the first user for requesting a provision of the opening state of the open mail.

5. The non-transitory storage medium according to claim 1, wherein the mail management program causes the computer to execute the operation that further comprises:

receiving an input of a comment to the open mail from the first user; and outputting the open mail and the second electronic mail includes outputting the comment together with the open mail.

6. The non-transitory storage medium according to claim 1, wherein the first time information at which the designation is received, is different than third time information corresponding to a receipt of the first electronic mail by the first user.

7. The non-transitory storage medium according to claim 1, wherein the first electronic mail is made open to a third user based on the designation.

8. The non-transitory storage medium according to claim 1, wherein the open mail and the second electronic mail output in accordance with the first and second time information are displayed in a list to the second user.

9. The non-transitory storage medium according to claim 8, wherein the open mail is displayed before the second electronic mail.

10. The non-transitory storage medium according to claim 8, wherein the open mail is displayed after the second electronic mail.

11. A mail management apparatus comprising:
a memory; and
a processor coupled to the memory and configured to:
receive a designation of a first electronic mail addressed to a first user as an open mail, which is made open to a second user,
set a receiving time at which the designation is received as first time information corresponding to the open mail,
set another receiving time at which a second electronic mail being received by the computer as second time information corresponding to the second electronic mail, the second electronic mail is not the open mail and is addressed to the second user,
provide, upon receipt of an output instruction from the second user, information about the open mail and the second electronic mail in accordance with the first and second time information,
when the designation is received, add a record into a mail management table, the record including user identification of the second user, the first time information, and a mail pass to a first mail information that includes a content of the first electronic mail; and
wherein the mail management table stores the record and another record that includes another user identification of the first user, third time information corresponding to a receipt of the first electronic mail by the first user, and the mail pass.

12. The mail management apparatus according to claim 11, wherein the first electronic mail is addressed and sent to the first user via webmail, and the second electronic mail is received by the computer via webmail.

13. A mail management method executed by a computer, comprising:
receiving from a first user, a designation of a first electronic mail addressed to the first user as an open mail, the first electronic mail is made open to a second user;
first setting a receiving time at which the designation is received as first time information corresponding to the open mail;
second setting another receiving time at which a second electronic mail being received by the computer as second time information corresponding to the second electronic mail, the second electronic mail is not the open mail and also being addressed to the second user;
upon receipt of an output instruction from the second user, outputting the open mail and the second electronic mail in accordance with the first and second time information, respectively,
when the designation is received, adding a record into a mail management table, the record including user identification of the second user, the first time information, and a mail pass to a first mail information that includes a content of the first electronic mail; and
wherein the mail management table stores the record and another record that includes another user identification of the first user, third time information corresponding to a receipt of the first electronic mail by the first user, and the mail pass.

14. The mail management method according to claim 13, wherein the first electronic mail is addressed and sent to the first user via webmail.

\* \* \* \* \*